US012458281B2

(12) United States Patent
Griffin et al.

(10) Patent No.: US 12,458,281 B2
(45) Date of Patent: Nov. 4, 2025

(54) EAR-WEARABLE DEVICES AND METHODS FOR MIGRAINE DETECTION

(71) Applicant: Starkey Laboratories, Inc., Eden Prairie, MN (US)

(72) Inventors: Kendra Griffin, Bloomington, MN (US); Paul N. Reinhart, Minneapolis, MN (US); Tim Schoof, Oakland, CA (US); Justin R. Burwinkel, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 202 days.

(21) Appl. No.: 18/147,359

(22) Filed: Dec. 28, 2022

(65) Prior Publication Data

US 2023/0277123 A1 Sep. 7, 2023

Related U.S. Application Data

(60) Provisional application No. 63/294,982, filed on Dec. 30, 2021.

(51) Int. Cl.
*A61B 5/00* (2006.01)
*H04R 1/10* (2006.01)

(52) U.S. Cl.
CPC .......... *A61B 5/4824* (2013.01); *A61B 5/4842* (2013.01); *A61B 5/486* (2013.01);
(Continued)

(58) Field of Classification Search
None
See application file for complete search history.

(56) References Cited

U.S. PATENT DOCUMENTS 9,167,356 B2 10/2015 Higgins et al.
9,210,518 B2 12/2015 Zhang
(Continued)

FOREIGN PATENT DOCUMENTS

WO 2006021820 3/2006
WO 2017079783 5/2017
(Continued)

OTHER PUBLICATIONS

"The Timeline of a Migraine Attack," American Migraine Foundation Article Published Jan. 18, 2018 at URL <https://americanmigrainefoundation.org/resource-library/amf-weighs-in-on-need-for-access-to-cgrp-treatments/> (9 pages).

*Primary Examiner* — Paul W Huber
(74) *Attorney, Agent, or Firm* — Pauly, DeVries Smith & Deffner LLC

(57) ABSTRACT

Embodiments herein relate to ear-wearable systems and devices that can detect migraine headaches. In an embodiment, an ear-wearable device is included having a control circuit, a microphone, and a sensor package. The ear-wearable device can be configured to evaluate at least one of signals from the microphone, signals from the sensor package, signals from an external sensor, and contextual factor data, and detect a migraine headache based on the evaluation. In an embodiment, an ear-wearable device system is included having a first ear-wearable device and a second ear-wearable device. In an embodiment, a method of predicting or detecting the onset or presence of a migraine headache with an ear-wearable system is included. Other embodiments are also included herein.

20 Claims, 15 Drawing Sheets

(52) U.S. Cl.
CPC ......... *A61B 5/6817* (2013.01); *H04R 1/1016* (2013.01); *H04R 1/1041* (2013.01); *H04R 1/1075* (2013.01)

(56) References Cited

U.S. PATENT DOCUMENTS

| | | |
|---|---|---|
| 9,219,964 B2 | 12/2015 | Merks |
| 9,848,273 B1 | 12/2017 | Helwani et al. |
| 10,390,771 B2 * | 8/2019 | Lorden ................ A61B 5/7246 |
| 11,172,909 B2 * | 11/2021 | Chan .................... A61B 5/7278 |
| 11,235,156 B2 * | 2/2022 | Romine ............. A61B 5/0004 |
| 11,559,255 B1 * | 1/2023 | Lisy .................... A61B 5/0533 |
| 11,883,197 B1 * | 1/2024 | Lisy ........................ A61B 5/01 |
| 2009/0005657 A1 * | 1/2009 | Bodlaender ............ A61B 5/165 |
| | | 600/301 |
| 2011/0130786 A1 | 6/2011 | Clayton et al. |
| 2014/0122109 A1 * | 5/2014 | Ghanbari ............... G16H 10/20 |
| | | 705/2 |
| 2018/0000425 A1 | 1/2018 | Hernacki |
| 2020/0143703 A1 | 5/2020 | Fabry et al. |
| 2020/0245938 A1 | 8/2020 | Xu et al. |
| 2020/0268265 A1 * | 8/2020 | Walsh .................. A61B 5/6803 |
| 2020/0268315 A1 * | 8/2020 | Burwinkel ............ A61B 5/4205 |
| 2022/0005494 A1 * | 1/2022 | Berisha ................ A61B 5/7282 |

FOREIGN PATENT DOCUMENTS

| | | |
|---|---|---|
| WO | 2019246456 | 12/2019 |
| WO | 2021016094 | 1/2021 |
| WO | 2021154822 | 8/2021 |
| WO | 2022026557 | 2/2022 |
| WO | 2022170091 | 8/2022 |

\* cited by examiner

EAR-WEARABLE DEVICES AND METHODS FOR MIGRAINE DETECTION

This application claims the benefit of U.S. Provisional Application No. 63/294,982, filed Dec. 30, 2021, the content of which is herein incorporated by reference in its entirety.

FIELD

Embodiments herein relate to ear-wearable systems, devices and methods. Embodiments herein further relate to ear-wearable systems and devices that can detect migraines and related conditions.

BACKGROUND

Globally, migraine headaches are considered the 3rd most prevalent illness and the 6th most debilitating. Over 4 million adults report chronic daily migraine headaches, which can be accompanied by anxiety/depression, sleep disturbances, visual disturbances, nausea, vomiting, dizziness, extreme sensitivity to sound, light, touch and smell, tingling or numbness in the extremities or face. Attacks or episode frequently last between 4 and 72 hours. However, migraine headaches remain poorly understood and effective treatment is challenging.

SUMMARY

Embodiments herein relate to ear-wearable systems and devices that can detect migraines and related conditions. In a first aspect, an ear-wearable device can be included having a control circuit, a microphone, wherein the microphone can be in electrical communication with the control circuit, and a sensor package, wherein the sensor package can be in electrical communication with the control circuit. The ear-wearable device can be configured to evaluate at least one of signals from the microphone, signals from the sensor package, signals from an external sensor, and contextual factor data, and predict or detect the onset or presence of a migraine based on the evaluation.

In a second aspect, in addition to one or more of the preceding or following aspects, or in the alternative to some aspects, the signals from the microphone, signals from the sensor package, and/or signals from an external sensor reflect signals from one or more physiologic sensors and/or one or more non-physiologic sensors.

In a third aspect, in addition to one or more of the preceding or following aspects, or in the alternative to some aspects, the physiologic sensors can include at least one selected from the group consisting of an ECG sensor, an EEG sensor, an EMG sensor, an EOG sensor, a GSR sensor, a PPG sensor, a motion sensor, a temperature sensor, a biochemical sensor, and a microphone.

In a fourth aspect, in addition to one or more of the preceding or following aspects, or in the alternative to some aspects, the non-physiologic sensors can include at least one selected from the group consisting of a motion sensor, a barometric pressure sensor, an optical sensor, and a microphone.

In a fifth aspect, in addition to one or more of the preceding or following aspects, or in the alternative to some aspects, the ear-wearable device can be configured to detect the onset or presence of the migraine by matching a signal pattern with one or more predetermined patterns indicating onset or presence of a migraine.

In a sixth aspect, in addition to one or more of the preceding or following aspects, or in the alternative to some aspects, the ear-wearable device can be configured to detect at least one migraine trigger.

In a seventh aspect, in addition to one or more of the preceding or following aspects, or in the alternative to some aspects, the migraine trigger can include at least one selected from the group consisting of a detected condition of stress, an amount and/or quality of sleep or a sleep pattern, an amount of food or drink intake, a type or content of food or drink, and/or a food or drink intake pattern, a hydration level, consumption of caffeine or alcohol, a time of day, a time of month, a time of year, medication usage, sensory exposure to at least one of noise, light, scents, and motion, and a weather status.

In an eighth aspect, in addition to one or more of the preceding or following aspects, or in the alternative to some aspects, the ear-wearable device can be configured to change a migraine onset detection parameter or threshold following detection of the migraine trigger.

In a ninth aspect, in addition to one or more of the preceding or following aspects, or in the alternative to some aspects, the ear-wearable device can be configured to query a device wearer regarding a detected onset or presence of a migraine.

In a tenth aspect, in addition to one or more of the preceding or following aspects, or in the alternative to some aspects, the ear-wearable device can be configured to query a device wearer regarding a severity of a detected migraine.

In an eleventh aspect, in addition to one or more of the preceding or following aspects, or in the alternative to some aspects, the ear-wearable device can be configured to query a device wearer regarding at least one of nausea, vomiting, and sensitivity to sound and light.

In a twelfth aspect, in addition to one or more of the preceding or following aspects, or in the alternative to some aspects, the ear-wearable device can be configured to receive input from a device wearer regarding a migraine.

In a thirteenth aspect, in addition to one or more of the preceding or following aspects, or in the alternative to some aspects, the contextual factor data can include at least one selected from the group consisting of time of day, geolocation, local weather data, device wearer sleep data, device wearer nutrition data, device wearer menstruation data, device wearer stress data, and device wearer medication data.

In a fourteenth aspect, in addition to one or more of the preceding or following aspects, or in the alternative to some aspects, the ear-wearable device can be configured to evaluate at least one of microphone data and motion sensor data to detect vomiting.

In a fifteenth aspect, in addition to one or more of the preceding or following aspects, or in the alternative to some aspects, the ear-wearable device can be configured to evaluate ECG data for one or more of PR interval lengthening, corrected QT interval lengthening, and changes in heart rate variability.

In a sixteenth aspect, in addition to one or more of the preceding or following aspects, or in the alternative to some aspects, the ear-wearable device can be configured to evaluate EEG data for one or more of a change in amplitude of contingent negative variation (CNV) and a pattern of changing alpha rhythm variability and/or asymmetry.

In a seventeenth aspect, in addition to one or more of the preceding or following aspects, or in the alternative to some aspects, the ear-wearable device can be configured to evaluate EMG data for changing levels of EMG activity.

In an eighteenth aspect, in addition to one or more of the preceding or following aspects, or in the alternative to some aspects, the ear-wearable device can be configured to evaluate EOG data for trends in REM density.

In a nineteenth aspect, in addition to one or more of the preceding or following aspects, or in the alternative to some aspects, the ear-wearable device can be configured to evaluate motion sensor data for one or more of device wearer posture, device wearer forward head extension, and device wearer imbalance.

In a twentieth aspect, in addition to one or more of the preceding or following aspects, or in the alternative to some aspects, the ear-wearable device can be configured to evaluate GSR data for one or more of hot sweat and indicators of cognitive load or stress.

In a twenty-first aspect, in addition to one or more of the preceding or following aspects, or in the alternative to some aspects, the ear-wearable device can be configured to evaluate body temperature data for changes in body temperature.

In a twenty-second aspect, in addition to one or more of the preceding or following aspects, or in the alternative to some aspects, the ear-wearable device can be configured to evaluate PPG data for one or more of blood vessel dilation status, constriction of blood vessels, and changes in heart rate variability.

In a twenty-third aspect, in addition to one or more of the preceding or following aspects, or in the alternative to some aspects, the ear-wearable device can be configured to evaluate biochemical sensor data for one or more of changes in estrogen and progesterone.

In a twenty-fourth aspect, in addition to one or more of the preceding or following aspects, or in the alternative to some aspects, the ear-wearable device can be configured to evaluate barometric pressure data for a change in atmospheric pressure.

In a twenty-fifth aspect, in addition to one or more of the preceding or following aspects, or in the alternative to some aspects, the ear-wearable device can be configured to evaluate optical sensor data for one or more of fluorescent light, blue light, LED lights, sunlight, light intensity, light duration, light brightness, and light flicker/flash frequency.

In a twenty-sixth aspect, in addition to one or more of the preceding or following aspects, or in the alternative to some aspects, the ear-wearable device can be configured to evaluate microphone data for one or more of loud noises, sound heterogeneity, predetermined environments, decreased speaking rate, slurred speech, speech fluency problems, device wearer babble, and phrases indicative of migraines.

In a twenty-seventh aspect, in addition to one or more of the preceding or following aspects, or in the alternative to some aspects, the ear-wearable device can be configured to classify a detected migraine.

In a twenty-eighth aspect, in addition to one or more of the preceding or following aspects, or in the alternative to some aspects, the ear-wearable device can be configured to deliver a suggestion to a device wearer regarding an action to take.

In a twenty-ninth aspect, in addition to one or more of the preceding or following aspects, or in the alternative to some aspects, the ear-wearable device can be configured to execute a mitigating action when a migraine can be detected.

In a thirtieth aspect, in addition to one or more of the preceding or following aspects, or in the alternative to some aspects, the mitigating action can include at least one selected from the group consisting of modifying a tinnitus therapy parameter, administering ASMR or binaural beat therapy, decreasing hearing aid gain, changing sound compression or expansion, decreasing blue light on one or more devices, decreasing room temperature, dimming lights, initiating aromatherapy, and delivering acoustic therapy.

In a thirty-first aspect, in addition to one or more of the preceding or following aspects, or in the alternative to some aspects, the ear-wearable device can be configured to detect or confirm with device wearer an alleviation event.

In a thirty-second aspect, in addition to one or more of the preceding or following aspects, or in the alternative to some aspects, the alleviation event can include at least one selected from the group consisting of a medication administration event, a cooler temperature about an ear of the device wearer, ambient light changes, meditation sounds, and body movements.

In a thirty-third aspect, in addition to one or more of the preceding or following aspects, or in the alternative to some aspects, the ear-wearable device can be configured to operate in a migraine accommodation mode when a migraine is detected or a device wearer provides an input to enter the migraine accommodation mode.

In a thirty-fourth aspect, in addition to one or more of the preceding or following aspects, or in the alternative to some aspects, the ear-wearable device can be configured to output data regarding a predicted or detected onset or presence of a migraine to an external device.

In a thirty-fifth aspect, in addition to one or more of the preceding or following aspects, or in the alternative to some aspects, the ear-wearable device can be configured to issue a notice regarding a predicted or detected onset or presence of a migraine to a third party.

In a thirty-sixth aspect, in addition to one or more of the preceding or following aspects, or in the alternative to some aspects, the migraine can include a migraine headache.

In a thirty-seventh aspect, an ear-wearable system can be included having a first ear-wearable device and a second ear-wearable device. The first ear-wearable device can include a first control circuit, a first microphone, wherein the first microphone can be in electrical communication with the first control circuit, and a first sensor package, wherein the first sensor package can be in electrical communication with the first control circuit. The second ear-wearable device can include a second control circuit, a second microphone, wherein the second microphone can be in electrical communication with the second control circuit, and a second sensor package, wherein the second sensor package can be in electrical communication with the second control circuit. The ear-wearable system can be configured to evaluate at least one of signals from the microphone, signals from the sensor package, signals from an external sensor, and contextual factor data, and predict or detect the onset or presence of a migraine based on the evaluation.

In a thirty-eighth aspect, in addition to one or more of the preceding or following aspects, or in the alternative to some aspects, the signals from the microphone, signals from the sensor package, and/or signals from an external sensor reflect signals from one or more physiologic sensors and/or one or more non-physiologic sensors.

In a thirty-ninth aspect, in addition to one or more of the preceding or following aspects, or in the alternative to some aspects, the physiologic sensors can include at least one selected from the group consisting of an ECG sensor, an EEG sensor, an EMG sensor, an EOG sensor, a GSR sensor, a PPG sensor, a motion sensor, a temperature sensor, a biochemical sensor, and a microphone.

In a fortieth aspect, in addition to one or more of the preceding or following aspects, or in the alternative to some aspects, the non-physiologic sensors can include at least one selected from the group consisting of a motion sensor, a barometric pressure sensor, an optical sensor, and a microphone.

In a forty-first aspect, in addition to one or more of the preceding or following aspects, or in the alternative to some aspects, the ear-wearable system can be configured to detect the onset or presence of the migraine by matching a signal pattern with one or more predetermined patterns indicating onset or presence of a migraine.

In a forty-second aspect, in addition to one or more of the preceding or following aspects, or in the alternative to some aspects, the ear-wearable system can be configured to detect at least one migraine trigger.

In a forty-third aspect, in addition to one or more of the preceding or following aspects, or in the alternative to some aspects, the migraine trigger can include at least one selected from the group consisting of a detected condition of stress, an amount and/or quality of sleep or a sleep pattern, an amount of food or drink intake, a type or content of food or drink, and/or a food or drink intake pattern, a hydration level, consumption of caffeine or alcohol, a time of day, a time of month, a time of year, medication usage, sensory exposure to at least one of noise, light, scents, and motion, and a weather status.

In a forty-fourth aspect, in addition to one or more of the preceding or following aspects, or in the alternative to some aspects, the ear-wearable system can be configured to change a migraine onset detection parameter or threshold following detection of the migraine trigger.

In a forty-fifth aspect, in addition to one or more of the preceding or following aspects, or in the alternative to some aspects, the ear-wearable system can be configured to query a device wearer regarding a detected onset or presence of a migraine.

In a forty-sixth aspect, in addition to one or more of the preceding or following aspects, or in the alternative to some aspects, the ear-wearable system can be configured to query a device wearer regarding a severity of a detected migraine.

In a forty-seventh aspect, in addition to one or more of the preceding or following aspects, or in the alternative to some aspects, the ear-wearable system can be configured to query a device wearer regarding at least one of nausea, vomiting, and sensitivity to sound and light.

In a forty-eighth aspect, in addition to one or more of the preceding or following aspects, or in the alternative to some aspects, the ear-wearable system can be configured to receive input from a device wearer regarding a migraine.

In a forty-ninth aspect, in addition to one or more of the preceding or following aspects, or in the alternative to some aspects, the contextual factor data can include at least one selected from the group consisting of time of day, geolocation, local weather data, device wearer sleep data, device wearer nutrition data, device wearer menstruation data, device wearer stress data, and device wearer medication data.

In a fiftieth aspect, in addition to one or more of the preceding or following aspects, or in the alternative to some aspects, the ear-wearable system can be configured to evaluate at least one of microphone data and motion sensor data to detect vomiting.

In a fifty-first aspect, in addition to one or more of the preceding or following aspects, or in the alternative to some aspects, the ear-wearable system can be configured to evaluate ECG data for one or more of PR interval lengthening, corrected QT interval lengthening, and changes in heart rate variability.

In a fifty-second aspect, in addition to one or more of the preceding or following aspects, or in the alternative to some aspects, the ear-wearable system can be configured to evaluate EEG data for one or more of a change in amplitude of contingent negative variation (CNV) and a pattern of changing alpha rhythm variability and/or asymmetry.

In a fifty-third aspect, in addition to one or more of the preceding or following aspects, or in the alternative to some aspects, the ear-wearable system can be configured to evaluate EMG data for changing levels of EMG activity.

In a fifty-fourth aspect, in addition to one or more of the preceding or following aspects, or in the alternative to some aspects, the ear-wearable system can be configured to evaluate EOG data for trends in REM density.

In a fifty-fifth aspect, in addition to one or more of the preceding or following aspects, or in the alternative to some aspects, the ear-wearable system can be configured to evaluate motion sensor data for one or more of device wearer posture, device wearer forward head extension, and device wearer imbalance.

In a fifty-sixth aspect, in addition to one or more of the preceding or following aspects, or in the alternative to some aspects, the ear-wearable system can be configured to evaluate GSR data for one or more of hot sweat and indicators of cognitive load or stress.

In a fifty-seventh aspect, in addition to one or more of the preceding or following aspects, or in the alternative to some aspects, the ear-wearable system can be configured to evaluate body temperature data for changes in body temperature.

In a fifty-eighth aspect, in addition to one or more of the preceding or following aspects, or in the alternative to some aspects, the ear-wearable system can be configured to evaluate PPG data for one or more of blood vessel dilation status, constriction of blood vessels, and changes in heart rate variability.

In a fifty-ninth aspect, in addition to one or more of the preceding or following aspects, or in the alternative to some aspects, the ear-wearable system can be configured to evaluate biochemical sensor data for one or more of changes in estrogen and progesterone.

In a sixtieth aspect, in addition to one or more of the preceding or following aspects, or in the alternative to some aspects, the ear-wearable system can be configured to evaluate barometric pressure data for a change in atmospheric pressure.

In a sixty-first aspect, in addition to one or more of the preceding or following aspects, or in the alternative to some aspects, the ear-wearable system can be configured to evaluate optical sensor data for one or more of fluorescent light, blue light, LED lights, sunlight, light intensity, light duration, light brightness, and light flicker/flash frequency.

In a sixty-second aspect, in addition to one or more of the preceding or following aspects, or in the alternative to some aspects, the ear-wearable system can be configured to evaluate microphone data for one or more of loud noises, sound heterogeneity, predetermined environments, decreased speaking rate, slurred speech, speech fluency problems, device wearer babble, and phrases indicative of migraines.

In a sixty-third aspect, in addition to one or more of the preceding or following aspects, or in the alternative to some aspects, the ear-wearable system can be configured to classify a detected migraine.

In a sixty-fourth aspect, in addition to one or more of the preceding or following aspects, or in the alternative to some aspects, the ear-wearable system can be configured to deliver a suggestion to a device wearer regarding an action to take.

In a sixty-fifth aspect, in addition to one or more of the preceding or following aspects, or in the alternative to some aspects, the ear-wearable system can be configured to execute a mitigating action when a migraine can be detected.

In a sixty-sixth aspect, in addition to one or more of the preceding or following aspects, or in the alternative to some aspects, the mitigating action can include at least one selected from the group consisting of modifying a tinnitus therapy parameter, administering ASMR or binaural beat therapy, decreasing hearing aid gain, changing sound compression or expansion, decreasing blue light on one or more devices, decreasing room temperature, dimming lights, initiating aromatherapy, and delivering acoustic therapy.

In a sixty-seventh aspect, in addition to one or more of the preceding or following aspects, or in the alternative to some aspects, the ear-wearable system can be configured to detect or confirm with device wearer an alleviation event.

In a sixty-eighth aspect, in addition to one or more of the preceding or following aspects, or in the alternative to some aspects, the alleviation event can include at least one selected from the group consisting of a medication administration event, a cooler temperature about an ear of the device wearer, ambient light changes, meditation sounds, and body movements.

In a sixty-ninth aspect, in addition to one or more of the preceding or following aspects, or in the alternative to some aspects, the ear-wearable system can be configured to operate in a migraine accommodation mode when a migraine is detected or a device wearer provides an input to enter the migraine accommodation mode.

In a seventieth aspect, in addition to one or more of the preceding or following aspects, or in the alternative to some aspects, the ear-wearable system can be configured to output data regarding a predicted or detected onset or presence of a migraine to an external device.

In a seventy-first aspect, in addition to one or more of the preceding or following aspects, or in the alternative to some aspects, the ear-wearable system can be configured to issue a notice regarding a predicted or detected onset or presence of a migraine to a third party.

In a seventy-second aspect, in addition to one or more of the preceding or following aspects, or in the alternative to some aspects, the migraine can include a migraine headache.

In a seventy-third aspect, a method of predicting or detecting the onset or presence of a migraine with an ear-wearable device or system is included. The method can include evaluating at least one of signals from a microphone, signals from a sensor package, signals from an external sensor, and contextual factor data, and predicting or detecting the onset or presence of the migraine based on the evaluation.

In a seventy-fourth aspect, in addition to one or more of the preceding or following aspects, or in the alternative to some aspects, the method can further include detecting the onset or presence of the migraine by matching a signal pattern with one or more predetermined patterns indicating onset or presence of a migraine.

In a seventy-fifth aspect, in addition to one or more of the preceding or following aspects, or in the alternative to some aspects, the method can further include detecting at least one migraine trigger.

In a seventy-sixth aspect, in addition to one or more of the preceding or following aspects, or in the alternative to some aspects, the method can further include changing a migraine onset detection parameter or threshold following detection of the migraine trigger.

In a seventy-seventh aspect, in addition to one or more of the preceding or following aspects, or in the alternative to some aspects, the method can further include querying a device wearer regarding a detected onset or presence of a migraine.

In a seventy-eighth aspect, in addition to one or more of the preceding or following aspects, or in the alternative to some aspects, the method can further include querying a device wearer regarding a severity of a detected migraine.

In a seventy-ninth aspect, in addition to one or more of the preceding or following aspects, or in the alternative to some aspects, the method can further include receiving input from a device wearer regarding a migraine.

In an eightieth aspect, in addition to one or more of the preceding or following aspects, or in the alternative to some aspects, the method can further include querying a device wearer regarding at least one of nausea, vomiting, and sensitivity to sound and light.

In an eighty-first aspect, in addition to one or more of the preceding or following aspects, or in the alternative to some aspects, the method can further include evaluating at least one of microphone data and motion sensor data to detect vomiting.

In an eighty-second aspect, in addition to one or more of the preceding or following aspects, or in the alternative to some aspects, the method can further include evaluating ECG data for one or more of PR interval change, corrected QT interval change, and heart rate variability change.

In an eighty-third aspect, in addition to one or more of the preceding or following aspects, or in the alternative to some aspects, the method can further include evaluating EEG data for one or more of a change in amplitude of contingent negative variation (CNV) and a pattern of increased alpha rhythm variability and/or asymmetry.

In an eighty-fourth aspect, in addition to one or more of the preceding or following aspects, or in the alternative to some aspects, the method can further include evaluating EMG data for a change in EMG activity.

In an eighty-fifth aspect, in addition to one or more of the preceding or following aspects, or in the alternative to some aspects, the method can further include evaluating EOG data for a change in REM density.

In an eighty-sixth aspect, in addition to one or more of the preceding or following aspects, or in the alternative to some aspects, the method can further include evaluating motion sensor data for one or more of device wearer posture, device wearer forward head extension, and device wearer imbalance.

In an eighty-seventh aspect, in addition to one or more of the preceding or following aspects, or in the alternative to some aspects, the method can further include evaluating GSR data for one or more of hot sweat and indicators of cognitive load or stress.

In an eighty-eighth aspect, in addition to one or more of the preceding or following aspects, or in the alternative to some aspects, the method can further include evaluating body temperature data for a change in body temperature.

In an eighty-ninth aspect, in addition to one or more of the preceding or following aspects, or in the alternative to some aspects, the method can further include evaluating PPG data for one or more of blood vessel dilation status, constriction of blood vessels, and a change in heart rate variability.

In a ninetieth aspect, in addition to one or more of the preceding or following aspects, or in the alternative to some aspects, the method can further include evaluating biochemical sensor data for changes in estrogen and progesterone.

In a ninety-first aspect, in addition to one or more of the preceding or following aspects, or in the alternative to some aspects, the method can further include evaluating barometric pressure data for a change in atmospheric pressure.

In a ninety-second aspect, in addition to one or more of the preceding or following aspects, or in the alternative to some aspects, the method can further include evaluating optical sensor data for one or more of fluorescent light, blue light, LED lights, sunlight, light intensity, light duration, light brightness, and light flicker/flash frequency.

In a ninety-third aspect, in addition to one or more of the preceding or following aspects, or in the alternative to some aspects, the method can further include evaluating microphone data for one or more of loud noises, sound heterogeneity, predetermined environments, decreased speaking rate, slurred speech, speech fluency problems, device wearer babble, and phrases indicative of migraines.

In a ninety-fourth aspect, in addition to one or more of the preceding or following aspects, or in the alternative to some aspects, the method can further include classifying a detected migraine.

In a ninety-fifth aspect, in addition to one or more of the preceding or following aspects, or in the alternative to some aspects, the method can further include delivering a suggestion to a device wearer regarding an action to take.

In a ninety-sixth aspect, in addition to one or more of the preceding or following aspects, or in the alternative to some aspects, the method can further include executing a mitigating action when a migraine can be detected.

In a ninety-seventh aspect, in addition to one or more of the preceding or following aspects, or in the alternative to some aspects, the method can further include detecting or confirm with device wearer an alleviation event.

In a ninety-eighth aspect, in addition to one or more of the preceding or following aspects, or in the alternative to some aspects, the method can further include operating in a migraine accommodation mode when a migraine is detected or a device wearer provides an input to enter the migraine accommodation mode.

In a ninety-ninth aspect, in addition to one or more of the preceding or following aspects, or in the alternative to some aspects, the method can further include outputting data regarding a predicted or detected onset or presence of a migraine to an external device.

In a one hundred and aspect, in addition to one or more of the preceding or following aspects, or in the alternative to some aspects, the method can further include issuing a notice regarding a predicted or detected onset or presence of a migraine to a third party.

In a one hundred and first aspect, in addition to one or more of the preceding or following aspects, or in the alternative to some aspects, the migraine can include a migraine headache.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
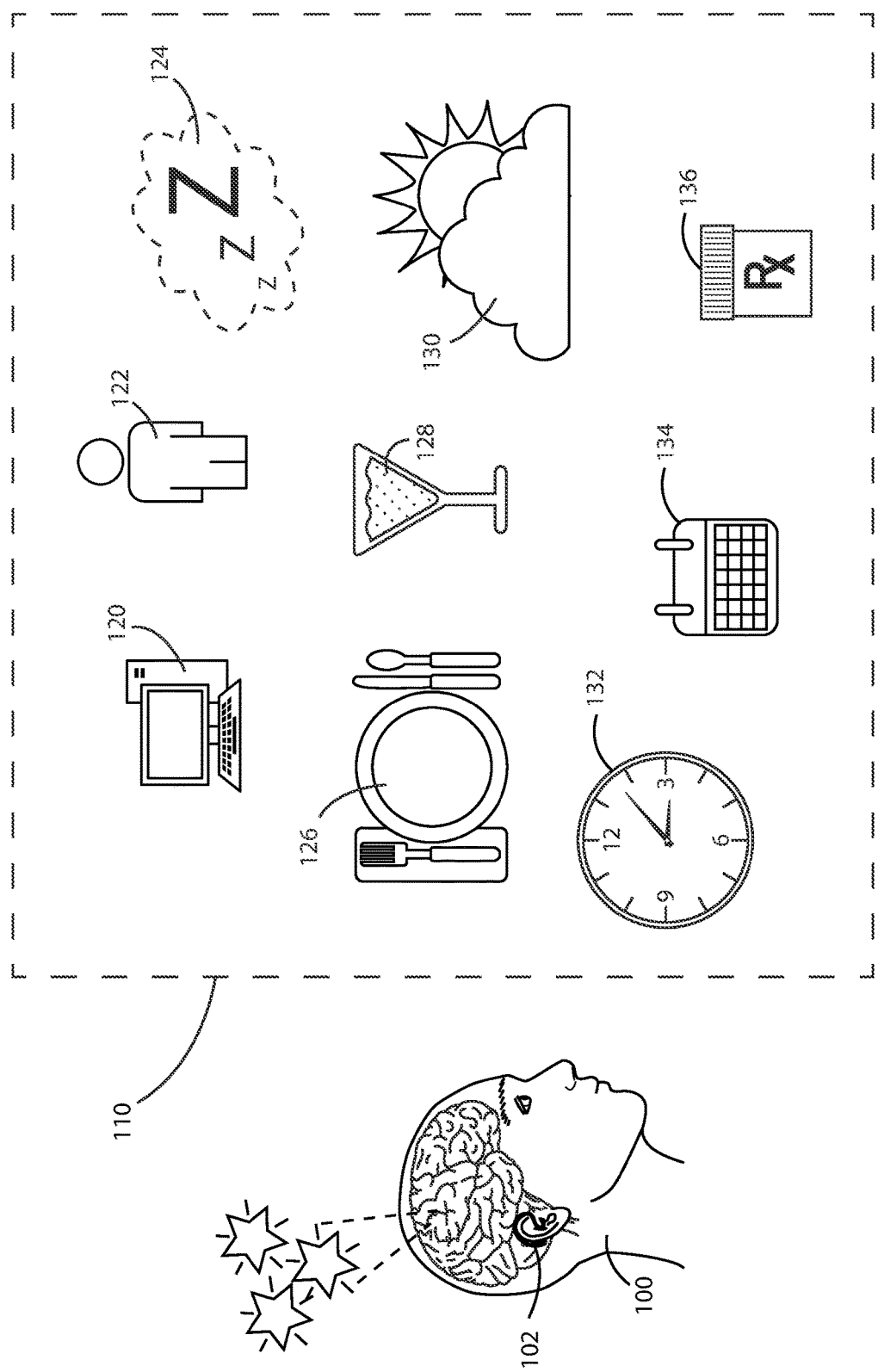
FIG. 1 is a schematic view of possible triggers and/or environmental factors related to migraine headaches in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As discussed above, migraine headaches are a serious health issue, yet they remain difficult to prevent and/or treat. However, early detection of a migraine headache episode as well as increased knowledge regarding what acts as a trigger for migraine headaches for a given individual can allow for more effective prevention and/or treatment. Embodiments herein can include ear-wearable devices and systems that can detect preliminary stages of migraines and, specifically, migraine headaches and/or triggers causing the same. Such devices and system can log the event and, in some embodiments, transmit data to caregiver or health care providers and/or provide instructions to the individual enabling more effective care for migraine headaches.

In various embodiments, the devices herein incorporate built-in sensors for measuring and analyzing multiple types of physiological data to detect migraine headache symptoms, including, but not limited to, microphone data, camera data, electroencephalograph (EEG) data, and electrocardiogram (ECG) data, electromyogram (EMG) data, electrooculogram (EOG) data, photoplethysmography (PPG) data, motion sensor data, galvanic skin response (GSR) data, temperature data, and biochemical sensor data amongst others. Data from these sensors, amongst other data utilized as described herein such as data from an external sensor, and contextual factor data, can be processed by devices and systems herein to accurately detect and/or gauge migraine headaches experienced by device wearers.

Machine learning models can be utilized herein for detecting migraine headaches and/or detecting triggers for migraine headaches and can be developed and trained with patient data, and deployed for on-device monitoring, classification, and communication, taking advantage of the fact that such ear-wearable devices will be continuously worn by the user, particularly in the case of users with hearing-impairment. Further, recognizing that symptoms associated with migraine headaches vary from person to person, as well as the fact that reactions to possible triggers vary highly amongst individuals, embodiments herein can include an architecture for personalization via on-device in-situ training and optimization phase(s).

In various embodiments, an ear-wearable therapy system is included having a control circuit, a sensor package, a microphone, and an electroacoustic transducer. The ear-wearable system can be configured to evaluate at least one of signals from the microphone, signals from the sensor package, signals from an external sensor, and contextual factor data and then detect a migraine headache based on the evaluation. In some embodiments, the system is configured to detect at least one migraine headache trigger. It will be appreciated that many migraine headaches triggers are possible, but in some cases can include at least one selected from the group consisting of a detected condition of stress, an amount and/or quality of sleep or a sleep pattern, an amount of food or drink intake, a type or content of food or drink (such as monosodium glutamate, chocolate, ripened or aged cheese, red wine, nuts, or the like), and/or a food intake pattern, a hydration level, consumption of caffeine or alcohol, a time of day, a time of month, a time of year, medication usage, sensory exposure to at least one of noise, light, scents, and motion, and a weather status.

References herein to migraines shall include all sorts of migraines including migraine headaches, acute migraines, chronic migraines, vestibular migraines, optical migraines, complex migraines, menstrual migraines, acephalgic migraines, hormonal migraines, unless the context dictates otherwise.

Referring now to FIG. 1, a schematic non-comprehensive view is shown of possible triggers 110 and/or contextual factors related to migraine headaches in accordance with various embodiments herein. In specific, FIG. 1 depicts a device wearer 100 with an ear-wearable device 102 that can be part of an ear-wearable system herein.

Stress can serve as a significant trigger of migraine headaches for many individuals. In accordance with various embodiments herein, physiological signs of stress can be detected by the device or system. Characteristic signs of stress can include an increased heart rate, an increased respiration rate, increased cortisol levels, and the like. Aspects of stress detection are described in U.S. Pat. Appl. No. 63/146,501, filed on Feb. 5, 2021, titled "MULTI-SENSORY EAR-WORN DEVICES FOR STRESS AND ANXIETY DETECTION AND ALLEVIATION", the content of which is herein incorporated by reference.

In accordance with various embodiments herein, circumstances or events likely to generate stress can be detected by the device or system. By way of example, work 120, including a work environment, may serve as a source of stress for various individuals. In various embodiments herein, work 120 can be detected based on the time of the day (e.g., does the time fall within normal working hours for an individual), their geolocation (e.g., does their present geolocation indicate they are at a work location), and/or through analysis of sound as picked up by a microphone of the ear-wearable device or system identifying a sound field consistent with a working location based on acoustic properties. In addition, certain individuals 122 may serve as a source of stress for various individuals. In various embodiments herein, the presence of certain individuals 122 with the device wearer can be detected based on analysis of sounds as picked up by a microphone of the ear-wearable device. The presence of certain individuals 122 with the device wearer can also be detected indirectly by detecting the presence of a device associated with the individual(s) 122. For example, detecting a BLUETOOTH advertising packet linked to a device associated with an individual(s) 122 can be used to indirectly detect the presence of the individual(s) 122. It will be appreciated that work 120 and certain individuals 122 are merely two examples of circumstances or events likely to generate stress that can be detected by the device or system.

Sound, generally, can serve to cause stress in some scenarios and therefore detection of the same such as with a microphone of the device or system herein can be important. For example, loud noises (e.g., noise exceeding a threshold level of decibels) and/or sound heterogeneity can influence the stress level of an individual. Thus, in various embodiments herein, the system/device can utilize information regarding detected sound to aid in detecting an individual's migraine headaches as well as possible migraine headache triggers. In addition, sound can impact the amount of listening effort required to be expended by the device wearer as well as the cognitive load of the device wearer. Both listening effort and cognitive load can be estimated by the system. In some embodiments, a detected average volume of ambient sound can be correlated with listening effort and cognitive load and therefore can be used to estimate the same. Aspects of determining listening effort and/or cognitive load are described in Pat. Appl. No. PCT/US2020/042571, the content of which is herein incorporated by reference.

In various embodiments, sleep 124 (such as the lack thereof), the quality of sleep, and/or sleep patterns can serve as triggers for migraine headaches. Sleep 124 can be detected herein using various sensors of the ear-wearable device. For example, sleep 124 can be detected using signals from an EEG sensor and detecting a signal pattern that match EEG patterns (predetermined and/or derived through system training) characteristic of sleep. Sleep 124 can also be detected by evaluating motion sensor signals and/or EOG signals to a detect movement pattern and/or eye movement that is consistent with sleep (such as one that matches predetermined and/or derived patterns that indicate sleep is occurring). Quality of sleep and/or sleep disturbances can be estimated by evaluating movement patterns as detected by evaluation of a motion sensor signal herein. For example, the motion sensor signal can be processed to determine the amount of body movements, the number of times a device wearer gets up, etc.

The amount of sleep 124 on a given night can be significant and evaluated by the system as a possible trigger of a migraine headache (e.g., an amount of sleep crossing a threshold value which could be 2, 3, 4, 5, 6, 7, 8, 9 or 10 hours or an amount falling between any of the foregoing). In addition, patterns or trends regarding sleep 124 can be significant and evaluated by the system as a possible trigger such as a trend of decreasing amounts of sleep or increasing amounts of sleep.

Meals 126 (or the lack thereof) and meal timing can relate to triggers for migraine headaches, knowledge of meals 126 can be an important consideration when detecting, monitoring, and/or predicting migraine headaches and/or triggers therefore. As such, in various embodiments, the ear-wearable system can be configured to detect meals and correlate migraine headaches with detected meals and/or the amount of time that has passed since a previous meal. In various embodiments herein, meals can be detected based on one or more of analysis of microphone data, analysis of motion sensor data, querying the device wearer, and/or receipt of a signal from another device. Loss of appetite and/or being nauseous can be a symptom of a migraine. In various embodiments, a loss of appetite as may accompany being nauseous can be detected through inference by detecting a decreased frequency of eating and/or a decreased amount (time of eating, volume of eating, etc.) of eating.

In addition, the type or content of food or drink consumed can be an important consideration when detecting, monitoring, and/or predicting migraine headaches and/or triggers therefore. For example, things such as monosodium glutamate, chocolate, ripened or aged cheese, red wine, nuts, and the like. As such, in various embodiments, the ear-wearable system can be configured to detect the type of food or drink consumed. In various embodiments herein, the type of food or drink can be detected based on one or more of analysis of microphone data, analysis of motion sensor data, querying the device wearer, and/or receipt of a signal from another device. In some embodiments, the type of food or drink can be detected as described in U.S. Publ. Appl. No. 2020/62966318, the content of which is herein incorporated by reference.

In some scenarios, the fluid intake can be considered with respect to migraine headache triggers. For example, dehydration can serve as a trigger for migraines. Further, alcohol 128 and caffeine intake can serve as a trigger for migraines for some individuals. In some embodiments herein, the device wearer can be queried regarding their consumption of fluids and the answers to such queries can be used to determine possible migraine headache triggers. In some embodiments herein, the device wearer can be queried specifically regarding their consumption of alcohol and/or caffeine and the answers to such queries can be used to determine possible migraine headache triggers. In some embodiments, changes in degrees of instability (such as detectable with a motion sensor), reaction speed, or speech patterns can be used by the system to infer amount of alcohol consumed. In some embodiments, geolocation (such as the geolocation of a tavern) or being in the company of specific individuals can be used by the system to infer consumption of alcohol.

In some embodiments, meals or fluid intake events can be identified based on identifying or matching characteristic patterns in the data from a microphone and/or other sensors such as motions sensors herein. For example, a "positive" pattern for sensor data associated with a meal or a fluid intake event can be stored by the system and current data can be periodically matched against such a pattern. If a match exceeding a threshold value is found, then a meal or a fluid intake event can be deemed to have taken place. Further details regarding meal and fluid intake detection are provided in U.S. Pat. Appl. No. 63/058,936, titled "Ear-Worn Devices with Oropharyngeal Event Detection", the contents of which are herein incorporated by reference in its entirety.

Similar to meals and the intake of beverages, knowledge of medication events (e.g., when a device wearer takes or otherwise receives a medication 136) can be an important consideration when detecting triggers for migraine headaches. For example, in some cases the medication itself can serve as the migraine headache trigger. In other cases, it may make a migraine headache to trigger more or less likely or more or less severe. In some embodiments, the ear-wearable system can be configured to detect medication administration events (through evaluation of sensor data and/or via response(s) to queries from the system to the device wearer) and determine a correlation between detected medication administration events and detected migraine headaches. Further details regarding medication event (such as taking or receiving a medication) detection are provided in U.S. Publ. Pat. Appl. No. 2020/0268315, titled "System and Method for Managing Pharmacological Therapeutics Including a Health Monitoring Device", the contents of which are herein incorporated by reference in its entirety.

In some embodiments, the correlation between detected medication administration events and detected migraine headaches can be used to titrate medication dosages. For example, if the system detects that migraine headaches occur at a different frequency or severity (such as a greater frequency or severity) after a change in medication dosage then the system can provide a suggestion to the device wearer and/or a clinician to change (increase or decrease) the medication dosage or change the dosage frequency to address the issue.

In some embodiments, time 132 (such as time of day) can also be an item relevant for consideration with respect to migraine headache triggers because the probabilities of exposure to certain types of triggers may be dependent on the time of day. Also, migraine headache may follow a pattern with respect to the time of day, with them being more likely at certain times of the day than at others. Thus, in various embodiments herein, the system/device can utilize information regarding the time of day to aid in detecting an individual's migraine headaches as well as possible migraine headache triggers.

The time point within a cycle (e.g., time of month, time of the year, menstruation cycle, wake cycle, moon phase cycle, seasonal cycle, weather cycle, etc.) such as represented by calendar 134, can also be an item relevant for consideration/evaluation with respect to detecting possible migraine headaches and/or migraine headache triggers. For example, some possible triggers for migraine headaches, such as the stress attendant holidays or certain events like birthdays, can be identified based on the day of the year. Further, hormonal changes that may characteristically fluctuate over the days of the month can serve as a trigger for migraine headaches. Thus, the day of the month can be considered for purposes of evaluating menstrual and other cycles influencing hormones (such as increases or decreases in estrogen and/or progesterone). In some embodiments, hormones such as estrogen or progesterone can be sensed with a biochemical sensor and/or data regarding the same can be received from an external device or an electronic medical records system.

In addition, weather 130, changes in the same, and/or ambient conditions can serve as a trigger for migraine headaches. Weather 130 as used herein can include aspects such as barometric pressure and changes in the same, amounts of natural light and/or changes in the same, storms, and the like. Information regarding weather 130 can be gathered through sensors of an ear-wearable device or system and/or can be received from external sources, such as external devices and/or through a weather API accessed through a data network. For example, in some embodiments herein the ear-wearable device or system can include a pressure sensor to detect ambient pressures. In some embodiments herein, the ear-wearable device or system can include a temperature sensor to detect ambient temperature. In some embodiments herein, the ear-wearable device or system can include a temperature sensor to detect ambient humidity. In some embodiments herein, the ear-wearable device or system can include a light sensor to detect ambient light levels (indoors or outdoors). Air quality can also serve as a trigger for migraine headaches. In some embodiments herein, the ear-wearable device or system can include or receive data from an air quality sensor. In some embodiments herein, the ear-wearable device or system can include or receive data from a volatile organic compounds (VOCs) index sensor. In some embodiments, the ear-wearable device or system can include or receive data from a particulate matter sensor.

Thus, in various embodiments herein, the system/device can utilize information regarding weather 130, including ambient conditions, to aid in detecting an individual's migraine headaches as well as possible migraine headache triggers.

Some aspects described with respect to FIG. 1 can be classified as contextual factor data. For example, in various embodiments herein, contextual factors can include at least one selected from the group consisting of time of day, geolocation, local weather data, device wearer sleep data, device wearer nutrition data, device wearer menstruation data, device wearer stress data, and device wearer medication data It will be appreciated that triggers for migraine headaches can be highly variable amongst individuals. As such, in various embodiments, the ear-wearable system can be configured to learn what possible triggers generate a migraine headache for an individual by correlating possible detected triggers with subsequent detected migraine headaches of the device wearer 100. In various embodiments, the ear-wearable system can be configured to weight certain possible detected triggers in the classification model more heavily based on the correlation with other detected events and/or detected data patterns. In some embodiments, this weighting can be applied explicitly by the system/device. In some embodiments, this weighting can be applied through the generation of a machine learning model which includes such information as inputs.

In various embodiments, the system and/or device can detect many different possible symptoms or markers that the individual is beginning to experience and/or experiencing a migraine headache. In various embodiments, the system and/or device can detect prodromes of migraines, auras of migraines, migraine headaches, postdromes of migraines, and the like. In various embodiments, the system and/or device can detect many different possible signs or markers of stress, which can serve as a trigger for a migraine headache.

Figure 2:
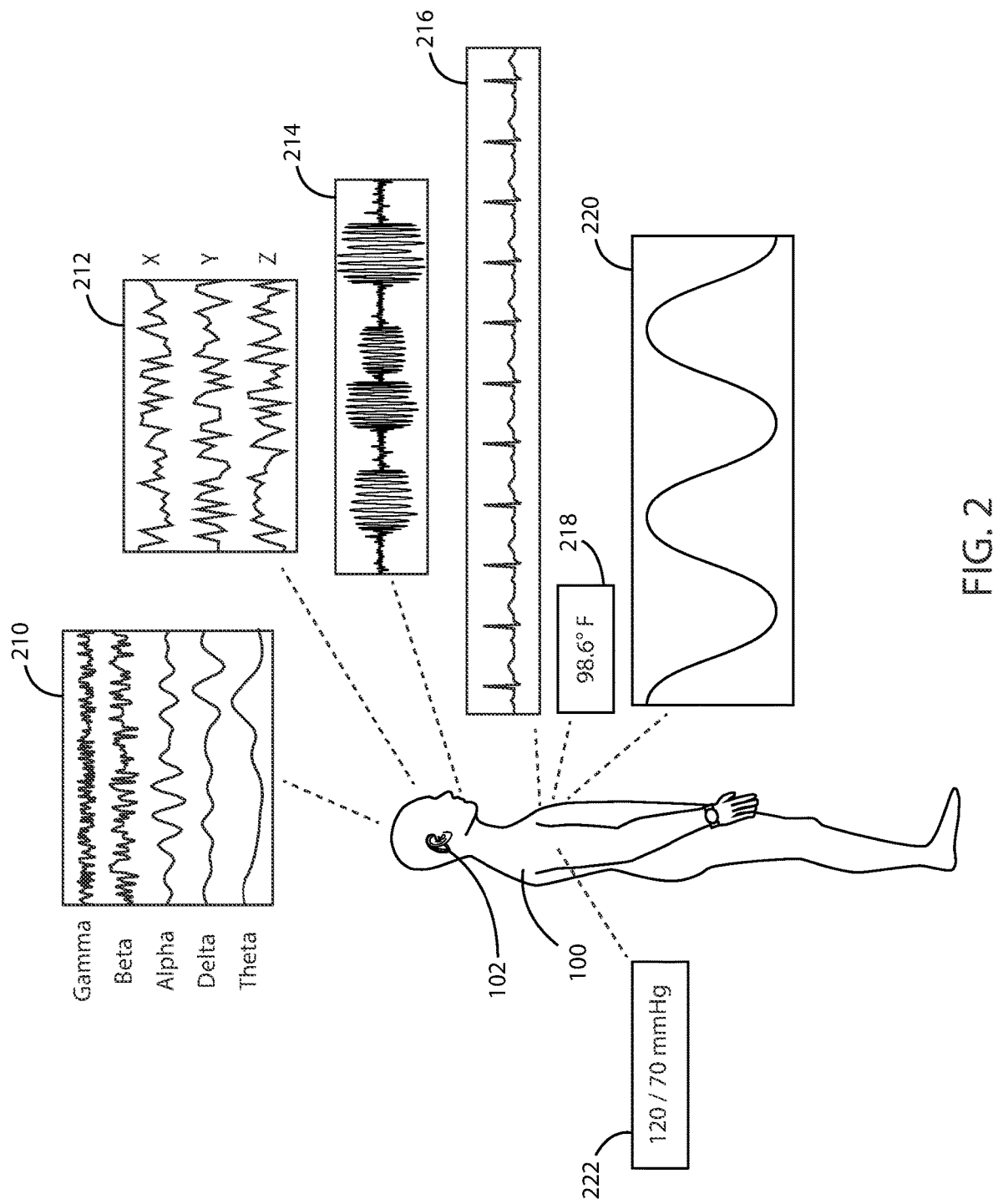
FIG. 2 is a schematic view of indicators of migraine headaches in accordance with various embodiments herein.

Referring now to FIG. 2, a schematic view is shown of some physiological indicators that can be detected in accordance with embodiments herein. In specific, FIG. 2 illustrates a device wearer 100 with an ear-wearable device 102. The ear-wearable device 102 can be used to directly sense and/or receive information regarding various sensed parameters. For example, the ear-wearable device 102 can include a sensor package (described in greater detail below) that can sense parameters including, but not limited to, electroencephalogram (EEG) data 210, accelerometer data 212 and/or gyroscope data from a motion sensor, the device wearer's voice 214, electrocardiogram (ECG) data 216 which can be used to determine heart rate and heart rate variability amongst other things, temperature data 218, respiratory data 220, and blood pressure data 222.

It will be appreciated, however, that the sensed parameters shown in FIG. 2 are only examples and that various other parameters and data are also contemplated herein. As an example, electromyography (EMG) data can also be used herein as muscular tonus is often increased while an individual is experiencing stress with can serve as a trigger for migraine headaches. EMG data can be evaluated to sense, for example, auricular muscle contraction or tone and/or jaw muscle contraction or tone which can be used as data herein to detect stress. In some cases, eye color, eye movement and/or pupil dilation can be evaluated herein to detect signs of a migraine headache. Aspects of detecting eye color, eye movement and pupil dilation as described in U.S. Publ. Pat. Appl. No. 2020/0143703, the content of which is herein incorporated by reference.

In some embodiments, a migraine may be accompanied by gait ataxia, dizziness/vertigo, or the like. In various embodiments herein, the system can detect gait ataxia and/or dizziness/vertigo by evaluating motion sensor signals and detecting characteristic patterns therein. In some embodiments, the system can query the device wearer regarding these conditions to detect whether they are occurring.

In various embodiments herein, the device wearer's voice 214 can be used to determine other factors bearing on whether they are experiencing migraine headaches. Properties of the device wearer's voice or speech and/or changes in the same can be detected using microphone data. In some cases, the device wearer may utter certain words or phrases when a migraine headache occurs. For example, they may say "my head hurts" or "another migraine". The device wearer may also utter certain words or phrases relating to the trigger for a migraine headache such as "it's so bright outside" or "I feel so stressed out". As such, in various embodiments, the ear-wearable device can be configured to detect words or phrases indicative of a migraine headache and/or indicative of a trigger for a migraine headache. In some cases, the ear-wearable device can process microphone signals to discern words being spoken. In some cases, data regarding the microphone signals can be sent to a remote server or computing platform via an API that returns information on words being spoken. In addition, in various embodiments herein, the ear-wearable device can be configured to detect decreased speaking rate, speech fluency problems, slurred speech, and/or device wearer babble and evaluate the same as indicative of a migraine headache and/or indicative of a trigger for a migraine headache.

Some sensors herein can be physiological sensors, whereas others can be (at least in part) non-physiological sensors. Non-physiological sensors herein can include at least one selected from the group consisting of a motion sensor, a barometric pressure sensor, and an optical sensor. Beyond other applications with respect to those described regarding weather above, optical sensor data herein can be specific for one or more of fluorescent light, blue light, LED lights, sunlight, light intensity, light duration, light brightness, and light flicker/flash frequency. In some cases, light avoidance can be a symptom of a migraine. Light avoidance behavior can be detected by evaluating optical sensor data to determine whether a change has occurred wherein the device wearer is spending more time in darker environments.

In various embodiments, symptoms of migraine headaches experienced by the device wearer 100 can be derived from data produced by at least one of the microphone and the sensor package. In various embodiments, the sensor package can specifically include at least one including at least one of an electroencephalograph (EEG) sensor, a electrocardiogram (ECG) sensor, an electromyogram (EMG) sensor, an electrooculogram (EOG) sensor, a photoplethysmography (PPG) sensor, a galvanic skin response (GSR) sensor, a motion sensor, a temperature sensor, and a biochemical sensor data amongst others.

In various embodiments, the detection of the migraine headaches can be based on at least one of microphone data, camera data, electroencephalograph (EEG) data, and electrocardiogram (ECG) data, electromyogram (EMG) data, electrooculogram (EOG) data, photoplethysmography (PPG) data, motion sensor data, galvanic skin response (GSR) data, temperature data, biochemical sensor data, data from an external sensor, and contextual factor data.

Sensor data indicating a migraine headache can include, for example, one or more of ECG data indicating one or more of PR interval lengthening, corrected QT interval lengthening, and decreased heart rate variability, EEG data indicating one or more of a change in amplitude of contingent negative variation (CNV) and a pattern of increased alpha rhythm variability and/or asymmetry, EMG data indicating increased EMG activity, EOG data indicating a decrease in REM density, GSR data indicating a hot sweat and/or indicators of cognitive load or stress, body temperature data showing an increase in body temperature, PPG data indicating one or more of dilation of blood vessels, constriction of blood vessels, and decreased heart rate variability, biochemical sensor data indicating decreases in estrogen and progesterone, barometric pressure data indicating a change in atmospheric pressure, or the like.

Baseline values for parameters and/or sensor data described herein can be determined by the system/device over time as the ear-wearable device is being worn. Baseline values can be important to establish as these values are typically unique to individuals. For example, resting heart rates vary substantially across individuals, as well as the quantum of heart rate increase as part of a migraine headache. In various embodiments, the device can enter a baseline establishment mode where for a period of time spanning hours, days, weeks, or even months all of these types of data are tracked and then subjected to statistical operations in order to set baseline values.

Changes over baseline values deemed to have significance can be set as a default value, can be programmed in by the device wearer or a third party, or can be related to a statistical measure of baseline values such as in units of standard deviation. In various embodiments, changes over a baseline value of greater than or equal to 5, 15, 25, 35, 45, 55, 65, 75, 85, 95, 100, 150, or 200 percent, or an amount falling within a range between any of the foregoing, can be deemed to be a marker of a migraine headache experienced by the device wearer. In some embodiments, the combination of measured parameters reflecting baseline or a normal state can be compared with a current combination of measured parameters using machine learning approaches or other statistical approaches to determine whether the current state substantially matches the baseline state (e.g., the device wearer is not currently experiencing migraine headaches) or is different than the baseline state (e.g., the device wearer is currently experiencing a migraine headache). In some embodiments, determinations can, in some cases, be binary (no migraine headaches vs. migraine headaches). In other embodiments, determinations can be non-binary reflecting degrees of migraine headaches being experienced by the device wearer. In some embodiments degrees of migraine headaches can be relative to personal history of the device wearer and in other embodiments relative to normative data aggregated from a population or other individuals or device wearers. In various embodiments herein, data regarding measured parameters and other data can be used to classify a level of migraine headaches experienced by a device wearer using a machine learning classification model as described in greater detail below.

Depending on the individual, some of the acute physiological changes in response to a migraine headache may be more prominent in some individuals versus others. As such, as described further below, systems and devices herein can adapt to an individual and thus more accurately detect the onset of a migraine headache. Correlations described herein can be derived using standard statistical technique that can show whether and how strongly pairs of variables and/or pairs of groups of variables are related.

It can be important to understand the specific triggers of migraine headaches for a particular individual. In various embodiments, the system and/or device can detect many different possible triggers or causes of triggers and, in some embodiments, empirically determine the impact of those triggers on the individual so that the relationship between possible triggers and migraine headaches for a given individual can be elucidated. In this way, the device can customize detection as well as possible interventions to be most effective for a given individual.

Ear-wearable devices herein, including hearing aids and hearables (e.g., wearable earphones), can include an enclosure, such as a housing or shell, within which internal components are disposed. Components of an ear-wearable device herein can include a control circuit, digital signal processor (DSP), memory (such as non-volatile memory), power management circuitry, a data communications bus, one or more communication devices (e.g., a radio, a near-field magnetic induction device), one or more antennas, one or more microphones, a receiver/speaker, a telecoil, and various sensors as described in greater detail below. More advanced ear-wearable devices can incorporate a long-range communication device, such as a BLUETOOTH® transceiver or other type of radio frequency (RF) transceiver.

Figure 3:
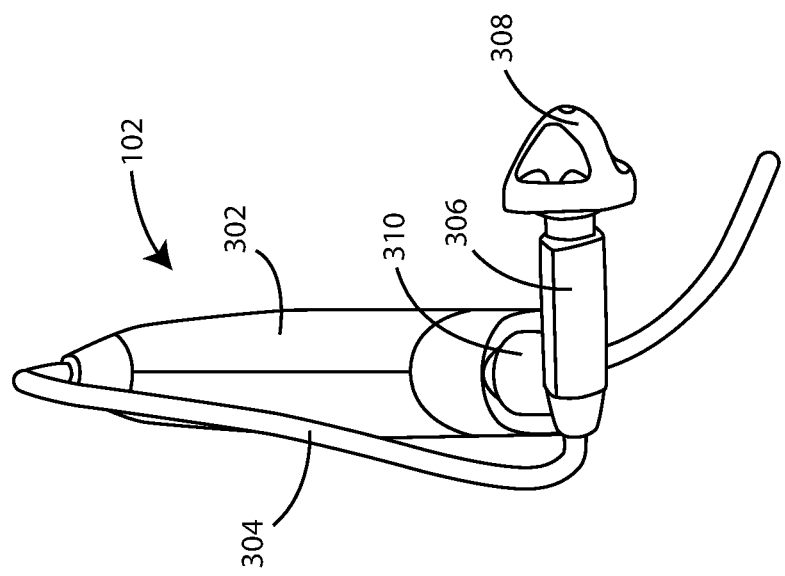
FIG. 3 is a schematic view of an ear-wearable device in accordance with various embodiments herein.

Referring now to FIG. 3, a schematic view of an ear-wearable device 102 is shown in accordance with various embodiments herein. The ear-wearable device 102 can include a device housing 302. The device housing 302 can define a battery compartment 310 into which a battery can be disposed to provide power to the device. The ear-wearable device 102 can also include a receiver 306 adjacent to an earbud 308. The receiver 306 an include a component that converts electrical impulses into sound, such as an electroacoustic transducer, speaker, or loudspeaker. A cable 304 or connecting wire can include one or more electrical conductors and provide electrical communication between components inside of the device housing 302 and components inside of the receiver 306.

The ear-wearable device 102 shown in FIG. 3 is a receiver-in-canal type device and thus the receiver is designed to be placed within the ear canal. However, it will be appreciated that many different form factors for ear-wearable devices are contemplated herein. As such, ear-wearable devices herein can include, but are not limited to, behind-the-ear (BTE), in-the ear (ITE), in-the-canal (ITC), invisible-in-canal (IIC), receiver-in-canal (RIC), receiver in-the-ear (RITE), completely-in-the-canal (CIC) type hearing assistance devices, a personal sound amplifier, implantable hearing devices (such as a cochlear implant, a brainstem implant, or an auditory nerve implant), a bone-anchored or otherwise osseo-integrated hearing device, or the like.

While FIG. 3 shows a single ear-wearable device, it will be appreciated that in various examples, a pair of ear-wearable devices can be included and can work as a system, e.g., an individual may wear a first device on one ear, and a second device on the other ear. In some examples, the same type(s) of sensor(s) may be present in each device, allowing for comparison of left and right data for data verification (e.g., increase sensitivity and specificity through redundancy), or differentiation based on physiologic location (e.g., physiologic signal may be different in one location from the other location.)

Ear-wearable devices of the present disclosure can incorporate an antenna arrangement coupled to a high-frequency radio, such as a 2.4 GHz radio. The radio can conform to an IEEE 802.11 (e.g., WIFI®) or BLUETOOTH® (e.g., BLE, BLUETOOTH® 4.2 or 5.0) specification, for example. It is understood that ear-wearable devices of the present disclosure can employ other radios, such as a 900 MHz radio. Ear-wearable devices of the present disclosure can be configured to receive streaming audio (e.g., digital audio data or files) from an electronic or digital source. Representative electronic/digital sources (also referred to herein as accessory devices) include an assistive listening system, a TV streamer, a remote microphone device, a radio, a smartphone, a cell phone/entertainment device (CPED), a programming device, or other electronic device that serves as a source of digital audio data or files.

Figure 4:
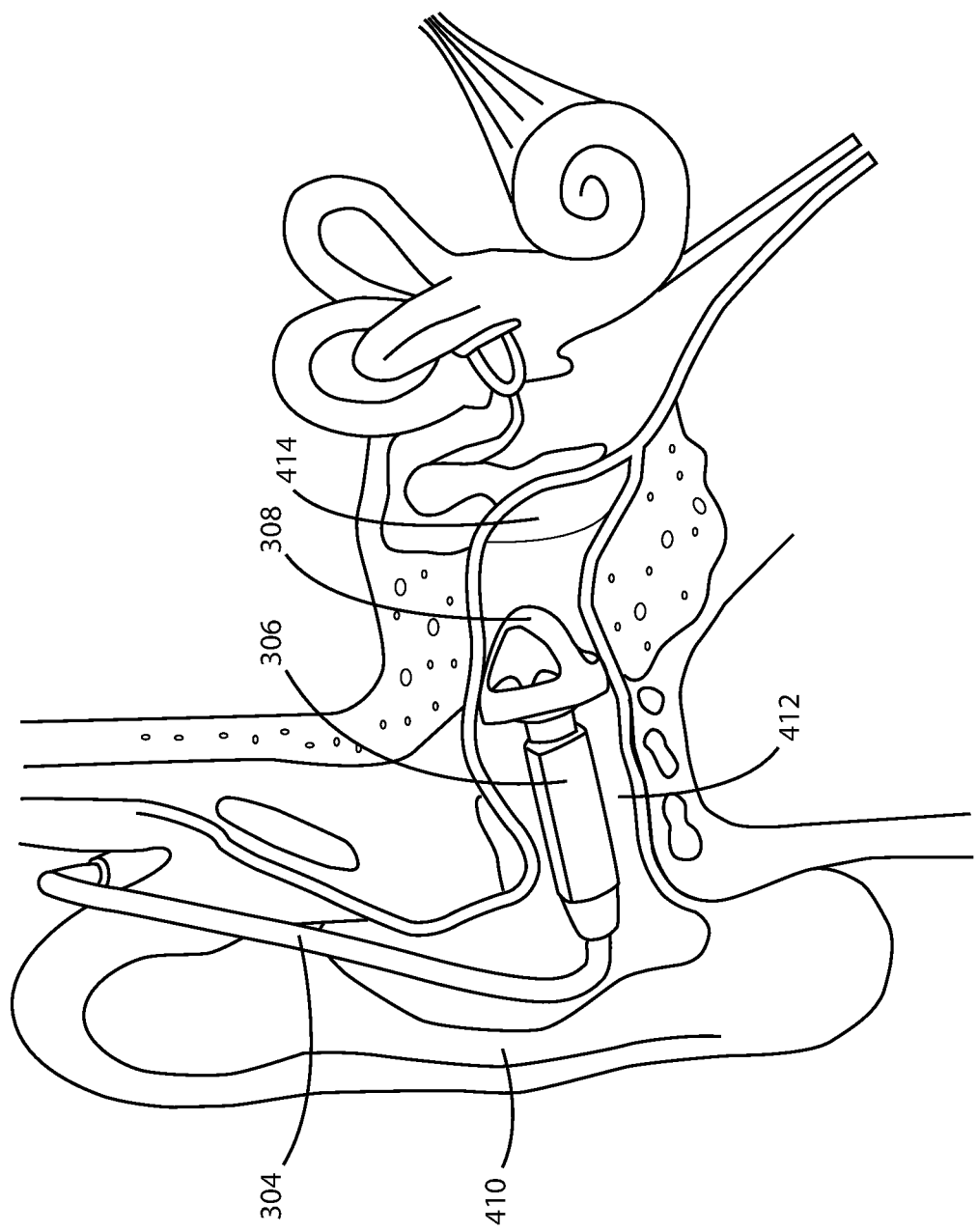
FIG. 4 is a schematic view of an ear-wearable device within the ear in accordance with various embodiments herein.

As mentioned above, the ear-wearable device 102 can be a receiver-in-canal (RIC) type device and thus the receiver is designed to be placed within the ear canal. Referring now to FIG. 4, a schematic view is shown of an ear-wearable device disposed within the ear of a subject in accordance with various embodiments herein. In this view, the receiver 306 and the earbud 308 are both within the ear canal 412, but do not directly contact the tympanic membrane 414. The hearing device housing is mostly obscured in this view behind the pinna 410, but it can be seen that the cable 304 passes over the top of the pinna 410 and down to the entrance to the ear canal 412.

Figure 5:
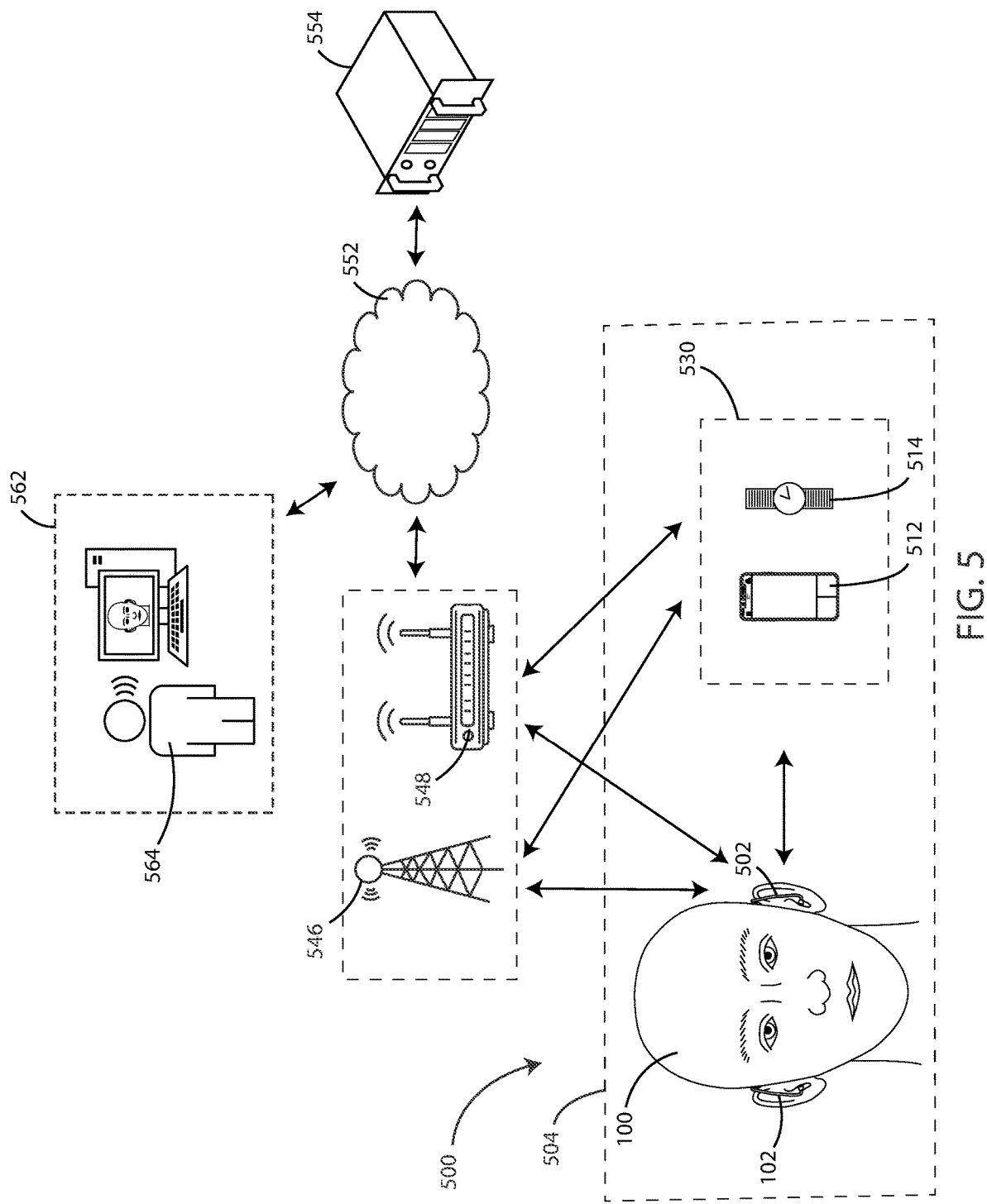
FIG. 5 is a schematic view of an ear-wearable system in accordance with various embodiments herein.

Referring now to FIG. 5, a schematic view of an ear-wearable system 500 is shown in accordance with various embodiments herein. FIG. 5 shows a device wearer 100 with an ear-wearable device 102 and a second ear-wearable device 502. The device wearer 100 is at a first location or patient location 504. The system can include and/or can interface with other devices 530 at the first location 504. The other devices 530 in this example can include an external device or accessory device 512, which could be a smart phone or similar mobile communication/computing device in some embodiments. The other devices 530 in this example can also include a wearable device 514, which could be an external wearable device 514 such as a smart watch or the like.

FIG. 5 also shows communication equipment including a cell tower 546 and a network router 548. FIG. 5 also schematically depicts the cloud 552 or similar data communication network. FIG. 5 also depicts a cloud computing resource 554. The communication equipment can provide data communication capabilities between the ear-wearable devices 102, 502 and other components of the system and/or components such as the cloud 552 and cloud resources such as a cloud computing resource 554. In some embodiments, the cloud 552 and/or resources thereof can host an electronic medical records system. In some embodiments, the cloud 552 can provide a link to an electronic medical records system. In various embodiments, the ear-wearable system 500 can be configured to send information regarding migraine headaches and/or possible migraine headache triggers to an electronic medical record system.

In some embodiments, the ear-wearable system 500 can be configured to receive information regarding migraine headache triggers or migraine headache-related events (such as testing information that may have been derived/performed in-clinic) as relevant to the individual through an electronic medical record system. Such received information can be used alongside data from microphones and other sensors herein and/or incorporated into machine learning classification models used herein.

FIG. 5 also shows a remote location 562. The remote location 562 can be the site of a third party 564, which can be a clinician, care provider, loved one, or the like. The third party 564 can receive reports regarding the identified migraine headaches of the device wearer and/or migraine headache triggers that have been detected. In some embodiments, the third party 564 can provide instructions for the device wearer regarding actions to take, such as actions to reduce or alleviate their migraine headaches, such as avoiding a particular trigger or to take a medication to treat their migraine headaches. In some embodiments, the system can send information and/or reports to the third party 564 regarding the device wearer's condition and/or migraine headaches including trends and/or changes in the same. In some scenarios, information and/or reports can be sent to the third party 564 in real-time. In other scenarios, information and/or reports can be sent to the third party 564 periodically.

In some embodiments, the ear-wearable device and/or system herein can be configured to issue a notice regarding a predicted or detected onset or presence of a migraine headache to a third party. In some cases, if the migraine headache is severe, emergency services can be notified. By way of example, if a detected migraine headache crosses a threshold value or severity, an emergency responder 524 can be notified.

In various embodiments, ear-wearable systems can be configured so that triggers of migraine headaches are derived from inputs provided by a device wearer. Such inputs can be direct inputs (e.g., an input that is directly related to migraine headaches) or indirect inputs (e.g., an input that relates to or otherwise indicates a symptom of a migraine headache, but indirectly). As an example of a direct input, the ear-wearable system can be configured so that a device wearer input in the form of a "tap" of the device can signal that the device wearer is experiencing one or more migraine headache symptoms. In some embodiments, the ear-wearable system can be configured to generate a query for the device wearer and the device wearer input can be in the form of a response to the query.

In some cases, the ear-wearable system can take various steps to confirm the presence of migraine headaches and/or reduce false positives associated with the detection of migraine headaches. For example, in some embodiments the ear-wearable system can be configured to query the device wearer about their symptoms when migraine headaches are detected. If the device wearer responds indicating that they do not perceive symptoms associated with a migraine headache then this can be taken as an indication of a false positive by the system. Conversely, if the device wearer responds indicating that they perceive symptoms associated with a migraine headache, then this can be taken as an indicator that a migraine headache is happening. In this manner, data from the sensors associated with such a response from the device wearer can be taken as a positive example of migraine headaches for use in supervised machine learning approaches as described in greater detail below.

In various embodiments, indicators of migraine headaches experienced by the device wearer can also be received by the ear-wearable system from an external source.

Systems herein can take actions to prevent or alleviate migraine headaches and related conditions. Preventative actions can include providing instructions to the device wearer (and/or a third party) regarding steps to take to prevent exposure to a trigger for migraine headaches. Triggers to avoid can be predetermined and/or programmed into the system, such as through input from a clinician or care provider. Triggers to avoid can also be derived by the system as it gathers data about the device wearer while being worn as described elsewhere herein. Triggers to avoid can specifically include any of those described with respect to FIG. 1 herein as well as others.

Systems herein can also take actions to alleviate symptoms of migraine headaches and related conditions. In some embodiments, the system can provide a suggestion or instruction to the device wearer to take a medication, such as an antihistamine or another drug.

Figure 6:
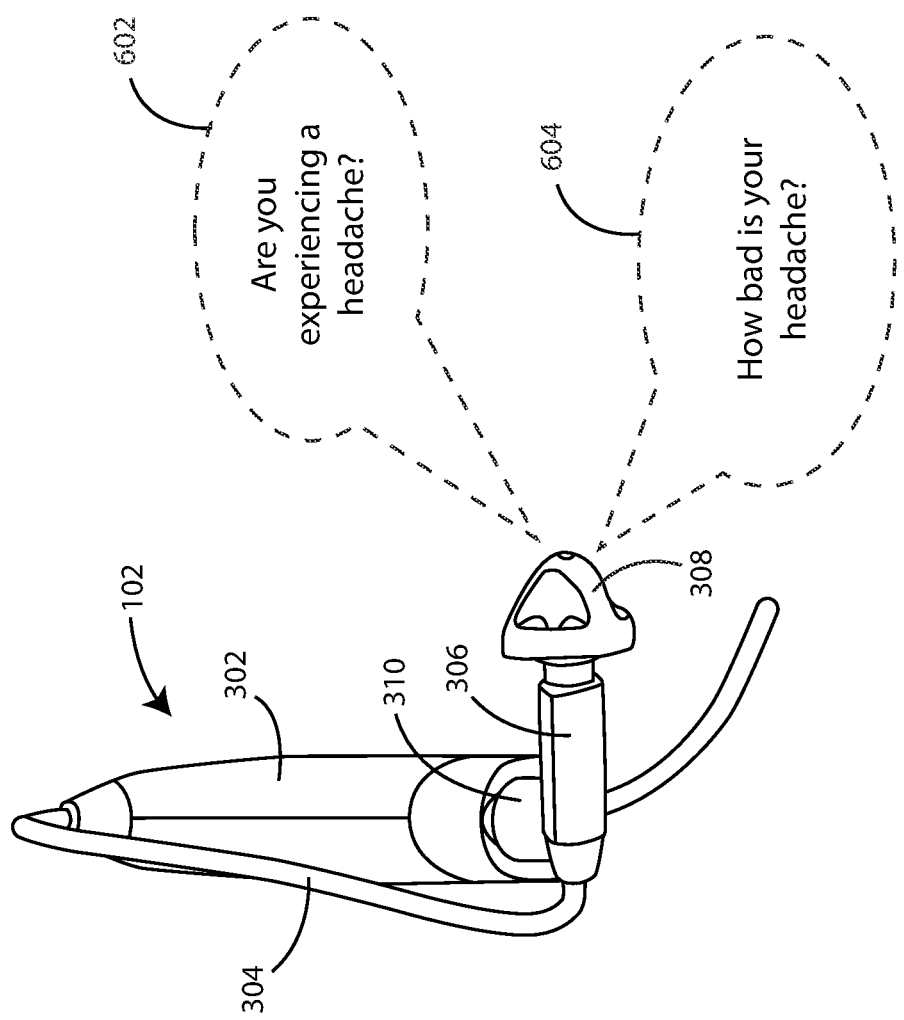
FIG. 6 is a schematic view of an ear-wearable device in accordance with various embodiments herein.

Referring now to FIG. 6, a schematic view of an ear-wearable device 102 is shown in accordance with various embodiments herein. The ear-wearable device 102 can be part of a system herein. The ear-wearable device 102 can include a housing 302, a cable 304, a receiver 306, an earbud 308, and a battery compartment 310. The ear-wearable system can be configured to generate and issue a wearer query 602. In some embodiments, the query 602 can be issued audibly by the ear-wearable device 102. However, by virtue of an electroacoustic transducer (or speaker) of the ear-wearable device 102 be positioned within or adjacent to the ear canal of the device wearer, the query 602 can be provided at a volume that can only be heard by the device wearer and thus discretely. The device wearer can respond to the query 602 in various ways. For example, in some embodiments, the device wearer can respond by way of a tap. In some embodiments, the device wearer can respond by way of a spoken answer that can be received by way of a microphone of the ear-wearable device. In some embodiments, the device wearer can respond by way of a specific gesture that can be identified by analyzing data from a motion sensor herein such as a head nod, head shake, or other head or body gesture.

In some embodiments, the query can specifically relate to a possible migraine headache or possible migraine headache trigger. For example, as shown in FIG. 6, the query 602 could relate to whether the device wearer believes they are currently experiencing a migraine headache. If the reply to the query is affirmative, then in various embodiments the ear-wearable device 102 can provide prompts for suggested steps and/or send an alert to a third-party. In some embodiments the query 604 can relate to a symptom of a possible migraine headache.

In some embodiments herein, queries, prompts, and/or stimulation for the device wearer can be generated and/or issued to the device wearer using a different device. For example, in some embodiments, an accessory device can be used to present a query to the device wearer.

Figure 7:
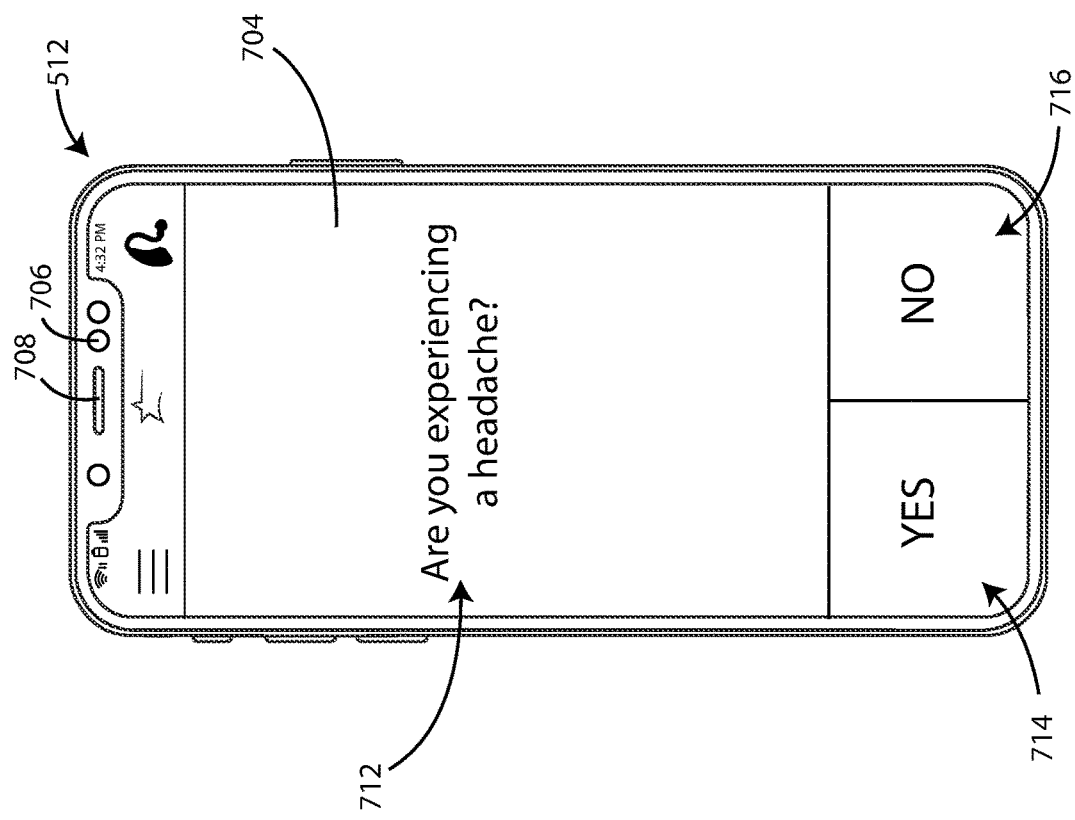
FIG. 7 is a schematic view of an accessory device in accordance with various embodiments herein.

Referring now to FIG. 7, a schematic view of an accessory device 512 is shown in accordance with various embodiments herein. The accessory device 512 includes a display screen 704. The accessory device 512 also includes a camera 706 and a speaker 708. The accessory device 512 can generate and/or present an accessory query 712 or alternatively a prompt or instruction. Queries herein can regard the device wearer's current condition, such as "are you experiencing a headache?" Queries herein can also include queries regarding whether the device wearer is experiencing any of the symptoms of migraines, such as those described herein. For example, in some cases, a migraine can be accompanied by visual disturbances. As such, a query to a device wearer can regard whether or not they are experiencing any visual problems, seeing spots or stars, etc. In order to receive input from the device wearer, the accessory device 512 can also include, for example, a first user input object 714 and a second user input object 716. In some cases, user input can be binary (yes/no). In other cases, user input can be on a scale, an open form input, or another form of input.

In various embodiments herein, the ear-wearable system can be configured to provide various pieces of information to the device wearer relating to migraine headaches and/or detected symptoms thereof. In many embodiments herein, the ear-wearable system can be configured to provide information and/or instructions to the device wearer in a discrete manner. For example, in various embodiments, the ear-wearable system can provide information and/or instructions related to migraine headaches or symptoms thereof through an electroacoustic transducer at volume that only the device wearer can hear. The information provided to the device wearer relating to migraine headaches and/or symptoms thereof can take many forms. In some embodiments, the information can comprise verbal information. In some embodiments, the information provided to the device wearer can be provided via non-verbal sound(s). By way of example, in various embodiments, non-verbal sounds provided by the ear-wearable device can include music. In various embodiments, the information relating to migraine headaches and/or symptoms thereof includes a sound preselected by the device wearer.

Figure 8:
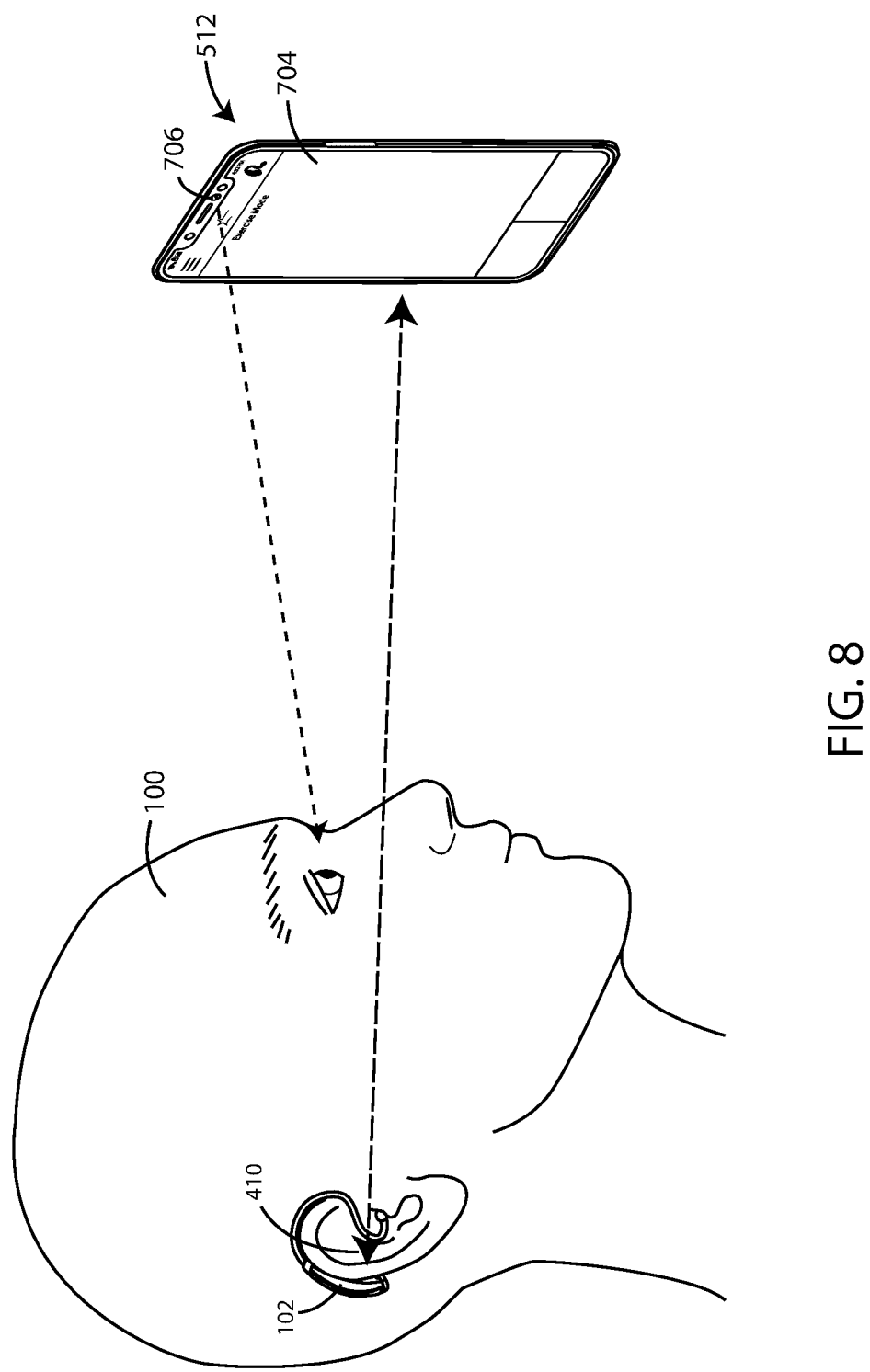
FIG. 8 is a schematic view is shown of device wearer interfacing with an external device in accordance with various embodiments herein.

Referring now to FIG. 8, a schematic view is shown of device wearer 100 interfacing with an accessory device 512 in accordance with various embodiments herein. The accessory device 512 (or external device) can include a display screen 704 and a camera 706. In some embodiments, the display screen 704 can be a touch screen. The display screen 704 can display various pieces of information to the device wearer 100 including, but not limited to, instructions for procedures to follow, visual feedback, information regarding the progress of the device wearer 100 through a particular set of procedures, or the like.

The camera 706 can be positioned to face toward the device wearer 100 (in some embodiments, the camera could also be facing the display, with the subject between the camera and the display screen using the display itself as a spatial reference). The camera 706 can be used to capture an image or images of the device wearer's 100 eyes and/or their facial skin. In various embodiments, the color of the device wearer's skin can be detected. This can be compared with a baseline value of skin color for the device wearer in order to detect aspects such as facial flushing, which can serve as a marker for a migraine headache. In addition, the color of the device wearer's eyes (such as the color of the sclera) can be detected to check for changes over a baseline value associated with redness which can serve as a marker for a migraine headache.

Figure 9:
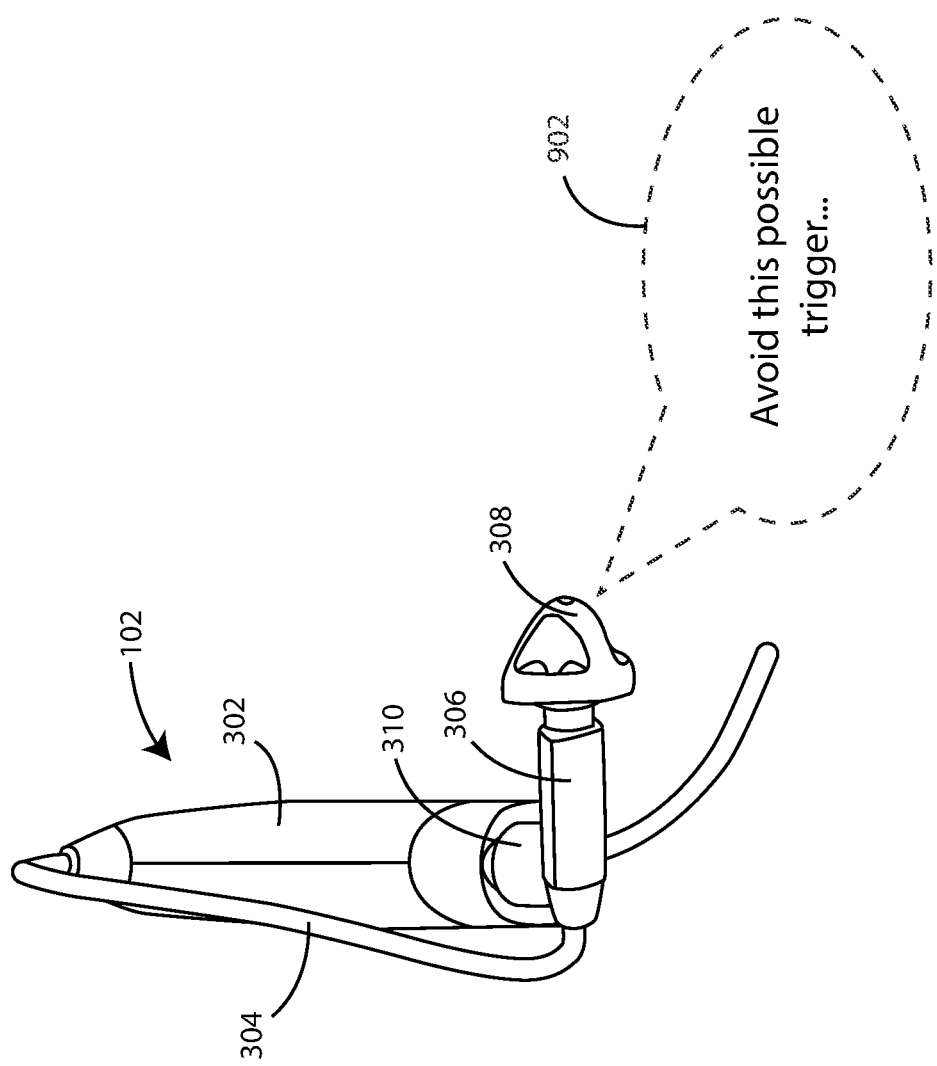
FIG. 9 is a schematic view of an ear-wearable device in accordance with various embodiments herein.

As described above, the system can take preventative actions such as providing instructions to the device wearer (and/or a third party) regarding steps to take to prevent exposure to a trigger for migraine headaches such as exposure to something serving as a trigger. Triggers to avoid can be predetermined and/or programmed into the system, such as through input from a clinician or care provider. Triggers to avoid can also be determined by the systems as specific for a given device wearer s described elsewhere herein. Referring now to FIG. 9, a schematic view of an ear-wearable device 102 is shown in accordance with various embodiments herein. The ear-wearable device 102 can be part of an ear-wearable system. The ear-wearable device 102 includes a housing 302, a cable 304, a receiver 306, an earbud 308, and a battery compartment 310. The ear-wearable system can be configured to provide information 902 to the device wearer, such as in a discrete manner. In various embodiments, the information relating to migraine headaches, symptoms thereof, instructions, or queries can be provided through an electroacoustic transducer that can be part of the receiver 306. In some embodiments, the information 902 can specifically include a suggestion to avoid a particular possible trigger, such as avoiding a particular trigger.

In some embodiments, the device or system can provide instructions or a suggestion to the device wearer (and/or a third party) regarding steps to take to address or otherwise mitigate symptoms of a migraine headache. In some embodiments, mitigating actions can include one or more of modifying a tinnitus therapy parameter, administering ASMR or binaural beat therapy, decreasing hearing aid gain, changing sound compression or expansion, suggesting sleep times, suggesting meal times, avoiding certain activities, decreasing blue light on one or more devices, decreasing room temperature, dimming lights, initiating aromatherapy, and delivering acoustic therapy. In some embodiments, the ear-wearable device can be configured to suggest, detect, or confirm with device wearer an alleviation event. In some embodiments, alleviating actions can also be suggested or initiated. In some embodiments, the alleviating action can include at least one selected from the group consisting of a medication administration event, a cooler temperature about an ear of the device wearer, ambient light changes, meditation sounds, and body movements.

Figure 10:
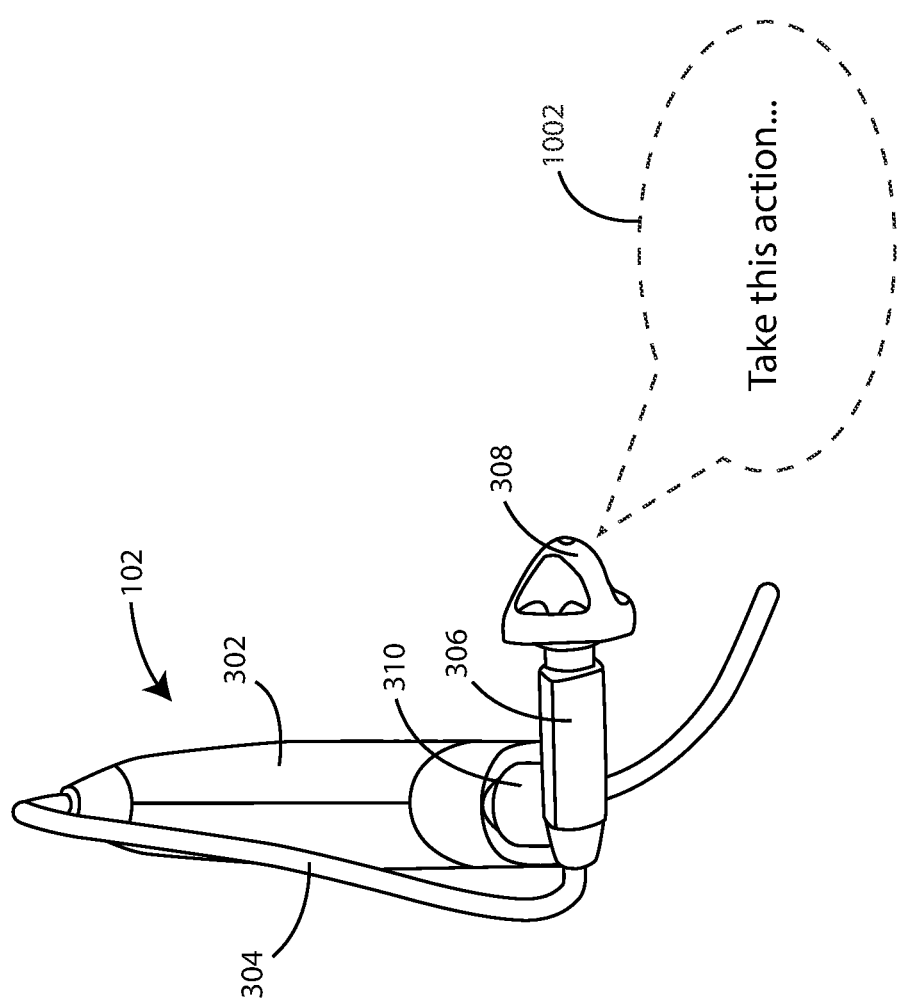
FIG. 10 is a schematic view of an ear-wearable device in accordance with various embodiments herein.

Referring now to FIG. 10, a schematic view of an ear-wearable device 102 is shown in accordance with various embodiments herein. The ear-wearable device 102 can be part of a system. The ear-wearable device 102 includes a housing 302, cable 304, receiver 306, earbud 308, and a battery compartment 310. The ear-wearable system can provide an instruction or suggestion 1002, such as to take a medication to address symptoms of a migraine headache. Medications can include, but are not limited to, analgesics, triptans, ergots, antinausea medications, glucocorticoids, beta blockers, antidepressants, opioids, anticonvulsants, and the like.

In some embodiments, the device or system can be configured to operate in a migraine accommodation mode when a migraine headache is detected or a device wearer provides an input to enter the migraine accommodation mode. A migraine accommodation mode can include various characteristic changes to operation of the ear-wearable device. For example, in some embodiments, a migraine accommodation mode can include reducing a volume or gain value of the ear wearable device so that device wearer is provided with softer, lower volume sounds.

In various embodiments, the ear-wearable system can be configured to correlate possible detected migraine headache triggers with subsequent migraine headaches of the device wearer to elucidate cause and effect relationships. Then this data can be used in various ways. For example, in some embodiments, the ear-wearable system can be configured to weight certain possible detected triggers in the machine learning classification model more heavily based on an identified correlation between a particular trigger and resulting migraine headache that holds true for the particular individual wearing the device. In some embodiments, such correlations can be used in order to predict future migraine headaches.

In various embodiments, the ear-wearable system can be configured to detect an occurrence of symptoms of migraine headache of the device wearer exceeding a threshold value. In various embodiments, the ear-wearable system can be configured to evaluate data from at least one of a microphone and a sensor package over a lookback period to detect a trigger of the migraine headaches exceeding a threshold value.

Figure 11:
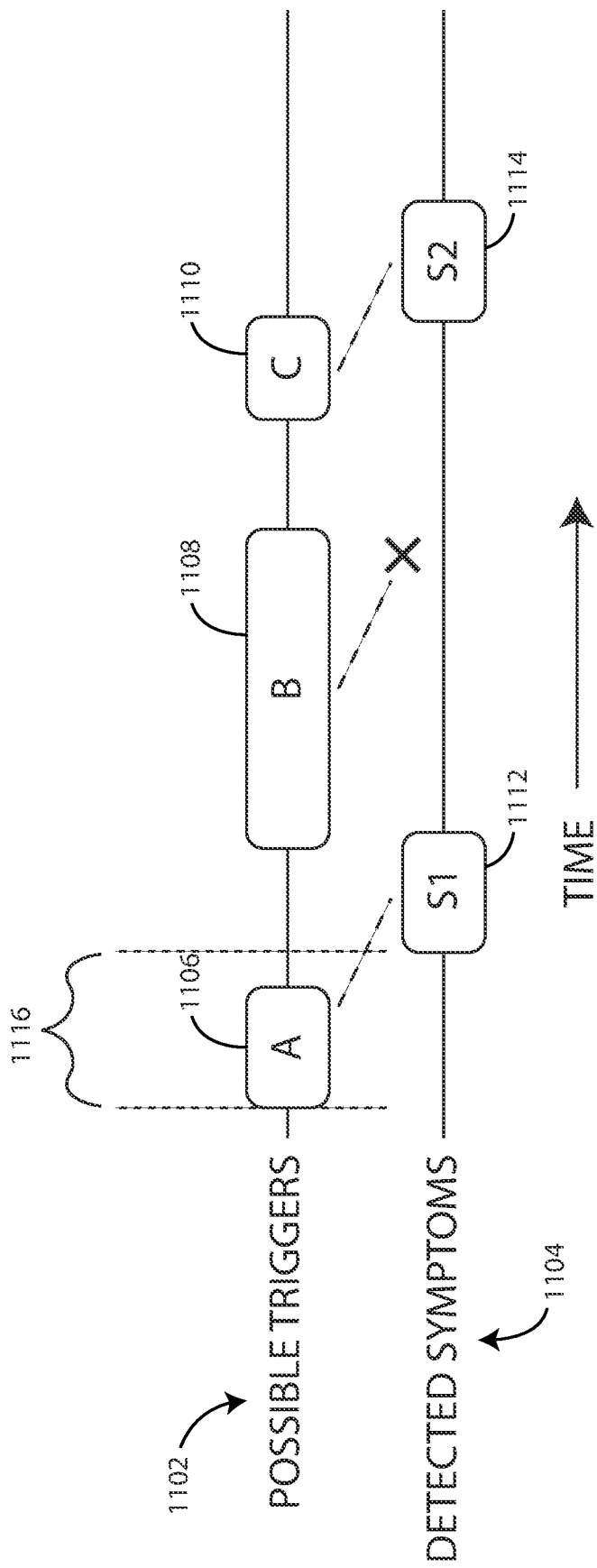
FIG. 11 is a schematic representation of possible triggers and detected allergy symptoms along a timeline.

Referring now to FIG. 11, a schematic representation is shown of possible triggers 1102 and detected migraine headache symptoms 1104 along a timeline. In this example, the possible triggers 1102 including trigger "A" 1106, "B" 1108, and "C" 1110. The detected symptoms 1104 includes episodes "S1" 1112 and "S2" 1114 that exceed a threshold value.

When a symptom episode is detected, the system can evaluate data from at least one of a microphone and a sensor package over a lookback period 1116. In this example, trigger "A" 1106 falls within the lookback period and this can be taken as an indication that trigger "A" 1106 may be a possible trigger that actually results in migraine headaches for the device wearer. To facilitate such operations, the device can be configured to store data for a rolling window of time reflecting the desired lookback period 1116.

In some embodiments, the lookback period 1116 can be greater than or equal to 5 seconds, 10 seconds, 30 seconds, 1 minute, 10 minutes, 20 minutes, 30 minutes, 40 minutes, 50 minutes, or 60 minutes, or can be an amount falling within a range between any of the foregoing.

In the example of FIG. 11, possible trigger "B" 1108 does not fall within a lookback period of any detected migraine headache symptom episode, thus possible trigger "B" 1108 is not an actual trigger for the individual wearing the device. Further, symptom episode S2 1114 appears to be linked with possible trigger "C" 1110 as it falls within the lookback period for symptom episode S2 1114. In this manner, the device can determine which possible triggers act as actual triggers for the specific individual wearing the device and which do not, thereby customizing the monitoring, detection, and prediction capabilities of the system/device for the particular individual. For example, referring again to FIG. 11, if possible trigger "A" 1106 is observed (which could be any of the potential triggers described herein as well as others) or seen to be imminent then the system can predict the onset of a migraine headache. As such, in some embodiments, the system can issue recommendations in advance to help the device wearer to either avoid the trigger or be in the best position to handle the expected migraine headache.

Detection of a migraine trigger makes it more likely that a migraine headache will occur later. To increase the sensitivity of detection of the later migraine, the ear-wearable device can be configured to change a migraine headache onset detection parameter or threshold following detection of a migraine trigger.

In some embodiments, information regarding relationships between triggers and migraine headache symptom episodes can be reported to the device wearer and/or to a third party. In some embodiments, relationships between triggers and migraine headache symptom episodes and other aspects (such as a worsening of tinnitus) can be analyzed and/or reported to the device wearer and/or a third party.

Figure 12:
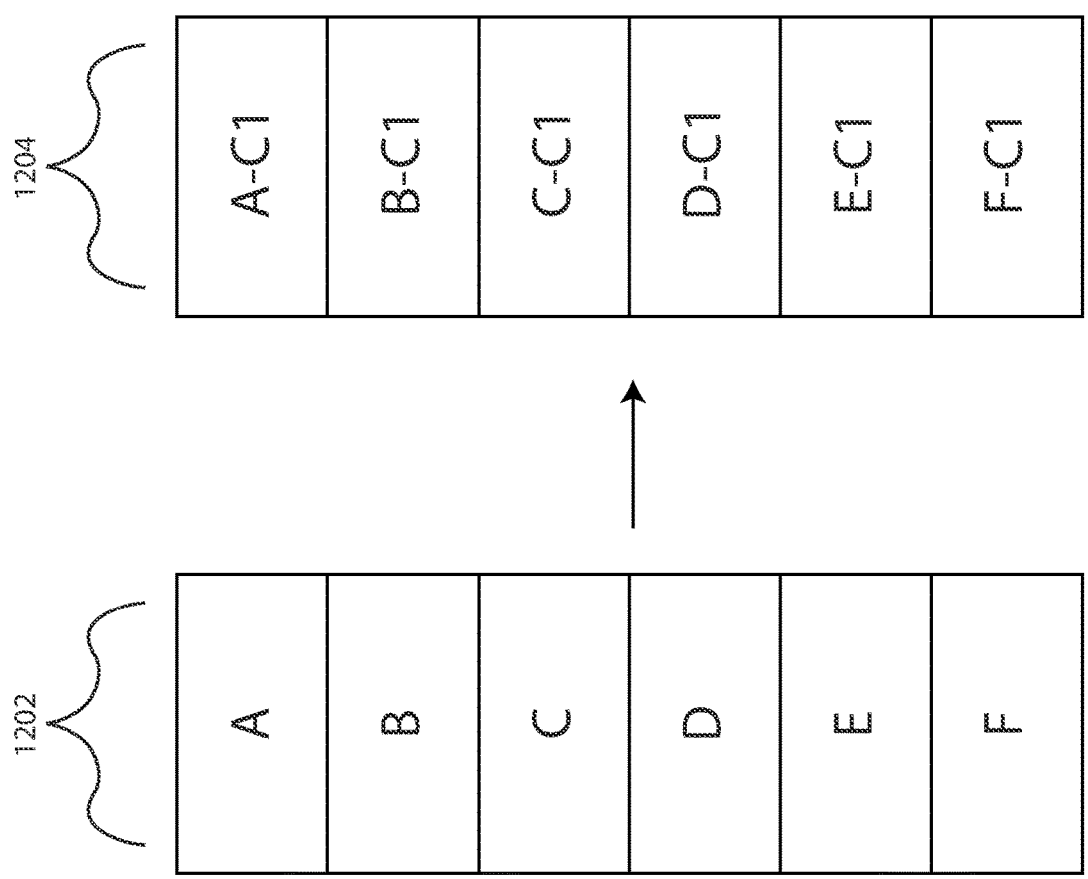
FIG. 12 is a schematic view of classification models in accordance with various embodiments herein.

Referring now to FIG. 12, a schematic view is shown of classification models in accordance with various embodiments herein. An ear-wearable system can include and/or utilize a first or default machine learning classification model 1202. In this example, the ear-wearable system also includes a customized classification model 1204, wherein the customized classification model 1204 is specific for the device wearer and is created over time as the device wearer utilizes the system.

The system can utilize data from any of the sensors described herein and/or any of the sources of data described herein (e.g., indicators of migraine headaches and/or symptoms thereof) in a machine learning approach to categorize a current level of migraine headache being experienced by the device wearer. For example, the ear-wearable system can be configured to evaluate data from at least one of the microphone and the sensor package and classify a migraine headache symptom level of a device wearer 100 using a machine learning classification model 1202 and periodically update the machine learning classification model to generate a second or customized machine learning classification model 1202 based on indicators of migraine headaches experienced by the device wearer.

In some embodiments, the initial or default machine learning classification model can be generated using sets of data gathered from individuals numbering in the hundreds, or thousands, or more. The initial or default machine learning classification model can be generated using supervised or unsupervised machine learning approaches.

In various embodiments, the ear-wearable system (described further below) can be configured to weight certain possible detected triggers in the machine learning classification model 1202 more heavily based on the correlation.

In some embodiments, the system can more accurately sense migraine headaches if a model is used that is specific for individuals sharing some characteristics with the individual wearing the ear-wearable device. For example, a model can be used wherein the model is specific for individuals of a certain gender falling within a specific age range. Many other factors can be used including, for example, health status, weight, medical history, and the like.

Figure 13:
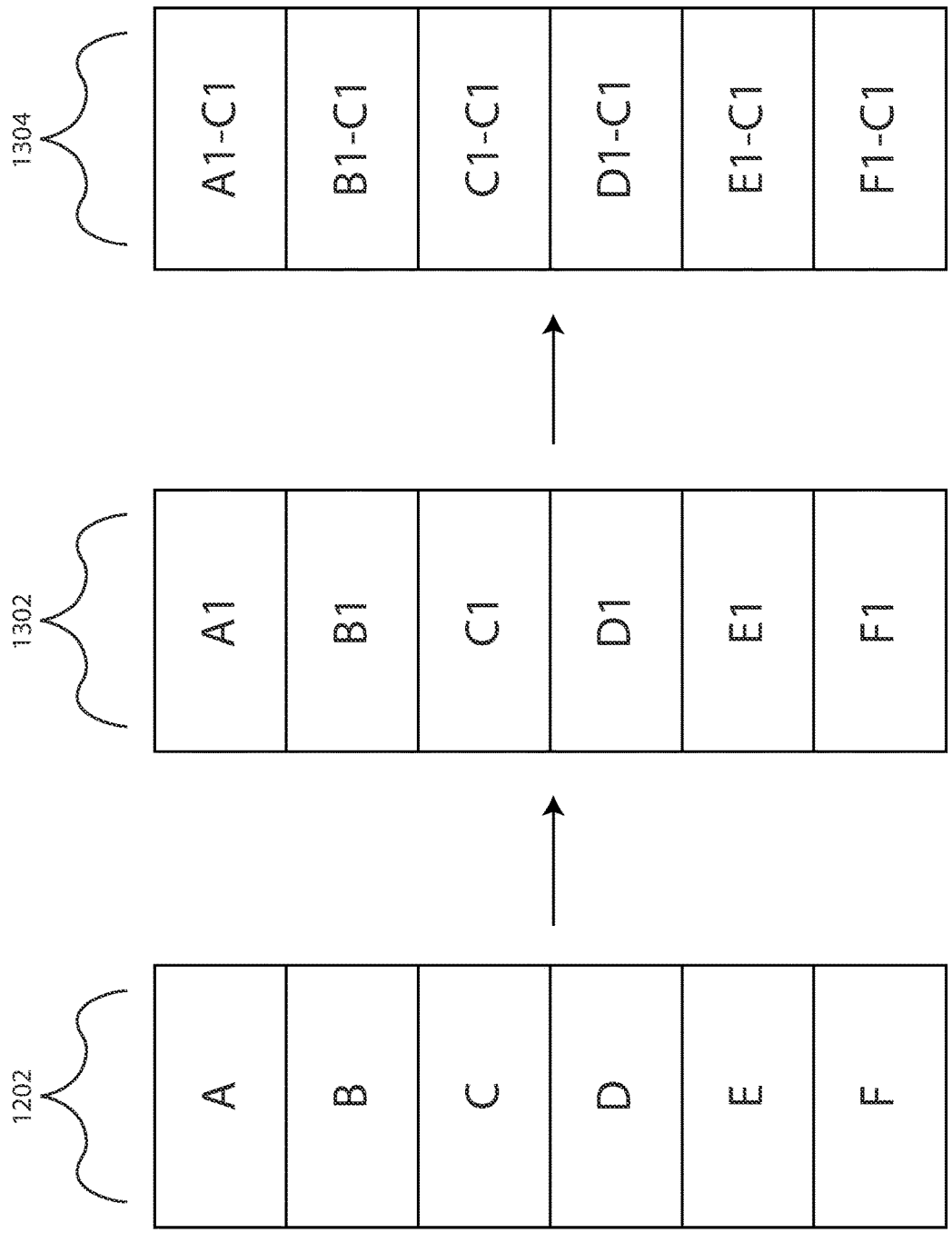
FIG. 13 is a schematic view of classification models in accordance with various embodiments herein.

Referring now to FIG. 13, a schematic view of classification models is shown in accordance with various embodiments herein. In this embodiment, if the system can determine or be provided with certain characteristics of the individual wearing the ear-wearable device, instead of starting with a default machine learning classification model 1202, the ear-wearable system can start with a characteristic or demographic specific classification model 1302. Using that model as a starting point, the ear-wearable system can further modify/update the model based on data while the individual is wearing the device to generate a customized model 1304 for later use. In some embodiments, the customized model 1304 can be updated indefinitely.

Ear-wearable devices of the present disclosure can incorporate an antenna arrangement coupled to a high-frequency radio, such as a 2.4 GHz radio. The radio can conform to an IEEE 802.11 (e.g., WIFI®) or BLUETOOTH® (e.g., BLE, BLUETOOTH® 4. 2 or 5.0) specification, for example. It is understood that ear-wearable devices of the present disclosure can employ other radios, such as a 900 MHz radio or radios operating at other frequencies or frequency bands. Ear-wearable devices of the present disclosure can be configured to receive streaming audio (e.g., digital audio data or files) from an electronic or digital source. Representative electronic/digital sources (also referred to herein as accessory devices) include an assistive listening system, a TV streamer, a radio, a smartphone, a cell phone/entertainment device (CPED) or other electronic device that serves as a source of digital audio data or files. Systems herein can also include these types of accessory devices as well as other types of devices.

Figure 14:
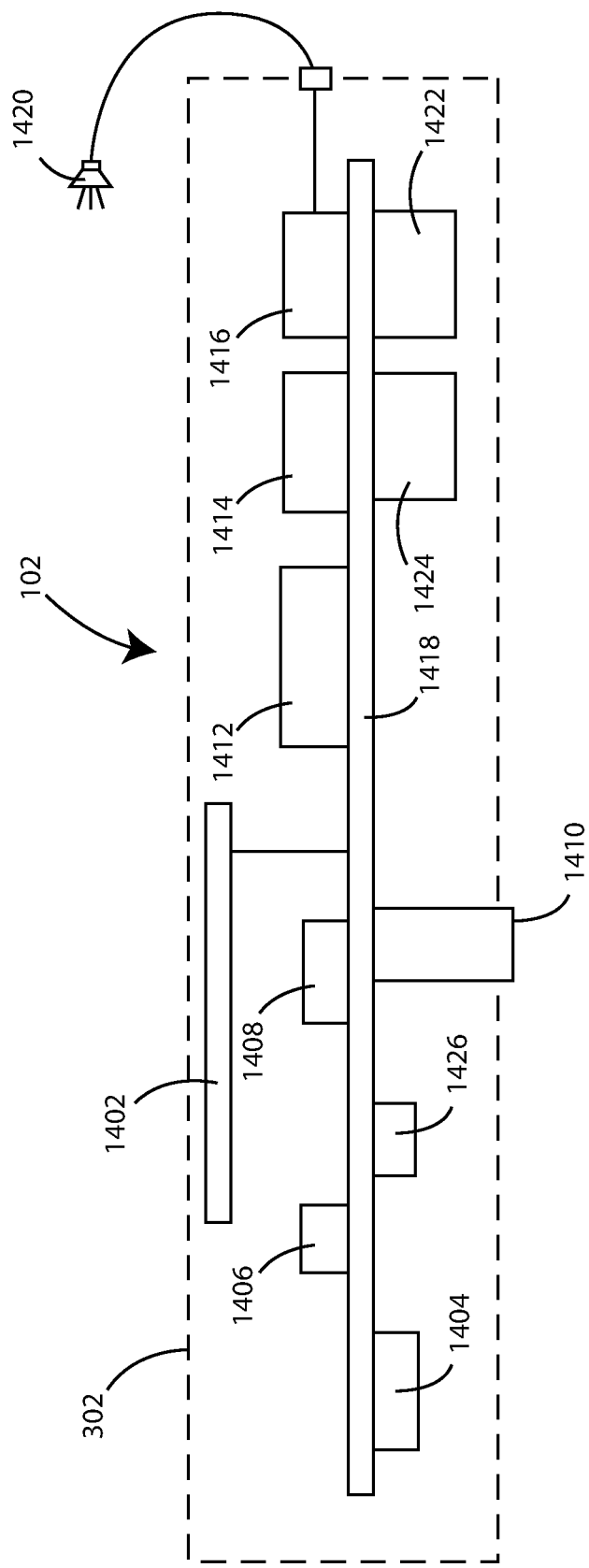
FIG. 14 is a block diagram view of components of an ear-wearable device in accordance with various embodiments herein.

Referring now to FIG. 14, a schematic block diagram is shown with various components of an ear-wearable device in accordance with various embodiments. The block diagram of FIG. 14 represents a generic ear-wearable device for purposes of illustration. The ear-wearable device 102 shown in FIG. 14 includes several components electrically connected to a flexible mother circuit 1418 (e.g., flexible mother board) which is disposed within housing 302. A power supply circuit 1404 can include a battery and can be electrically connected to the flexible mother circuit 1418 and provides power to the various components of the ear-wearable device 102. One or more microphones 1406 are electrically connected to the flexible mother circuit 1418, which provides electrical communication between the microphones 1406 and a digital signal processor (DSP) 1412. Microphones herein can be of various types including, but not limited to, unidirectional, omnidirectional, MEMS based microphones, piezoelectric microphones, magnetic microphones, electret condenser microphones, and the like. Among other components, the DSP 1412 incorporates or is coupled to audio signal processing circuitry configured to implement various functions described herein. A sensor package 1414 can be coupled to the DSP 1412 via the flexible mother circuit 1418. The sensor package 1414 can include one or more different specific types of sensors such as those described in greater detail below. One or more user switches 1410 (e.g., on/off, volume, mic directional settings) are electrically coupled to the DSP 1412 via the flexible mother circuit 1418. It will be appreciated that the user switches 1410 can extend outside of the housing 302.

An audio output device 1416 is electrically connected to the DSP 1412 via the flexible mother circuit 1418. In some embodiments, the audio output device 1416 comprises a speaker (coupled to an amplifier). In other embodiments, the audio output device 1416 comprises an amplifier coupled to an external receiver 1420 adapted for positioning within an ear of a wearer. The external receiver 1420 can include an electroacoustic transducer, speaker, or loud speaker. The ear-wearable device 102 may incorporate a communication device 1408 coupled to the flexible mother circuit 1418 and to an antenna 1402 directly or indirectly via the flexible mother circuit 1418. The communication device 1408 can be a BLUETOOTH® transceiver, such as a BLE (BLUETOOTH® low energy) transceiver or other transceiver(s) (e.g., an IEEE 802.11 compliant device). The communication device 1408 can be configured to communicate with one or more external devices, such as those discussed previously, in accordance with various embodiments. In various embodiments, the communication device 1408 can be configured to communicate with an external visual display device such as a smart phone, a video display screen, a tablet, a computer, or the like.

In various embodiments, the ear-wearable device 102 can also include a control circuit 1422 and a memory storage device 1424. The control circuit 1422 can be in electrical communication with other components of the device. In some embodiments, a clock circuit 1426 can be in electrical communication with the control circuit. The control circuit 1422 can execute various operations, such as those described herein. In various embodiments, the control circuit 1422 can execute operations resulting in the provision of a user input interface by which the ear-wearable device 102 can receive inputs (including audible inputs, touch based inputs, and the like) from the device wearer. The control circuit 1422 can include various components including, but not limited to, a microprocessor, a microcontroller, an FPGA (field-programmable gate array) processing device, an ASIC (application specific integrated circuit), or the like. The memory storage device 1424 can include both volatile and non-volatile memory. The memory storage device 1424 can include ROM, RAM, flash memory, EEPROM, SSD devices, NAND chips, and the like. The memory storage device 1424 can be used to store data from sensors as described herein and/or processed data generated using data from sensors as described herein.

It will be appreciated that various of the components described in FIG. 14 can be associated with separate devices and/or accessory devices to the ear-wearable device. By way of example, microphones can be associated with separate devices and/or accessory devices. Similarly, audio output devices can be associated with separate devices and/or accessory devices to the ear-wearable device. Further accessory devices as discussed herein can include various of the components as described with respect to an ear-wearable device. For example, an accessory device can include a control circuit, a microphone, a motion sensor, and a power supply, amongst other things.

Accessory devices or external devices herein can include various different components. In some embodiments, the accessory device can be a personal communications device, such as a smart phone. However, the accessory device can also be other things such as a secondary wearable device, a handheld computing device, a dedicated location determining device (such as a handheld GPS unit), or the like.

Figure 15:
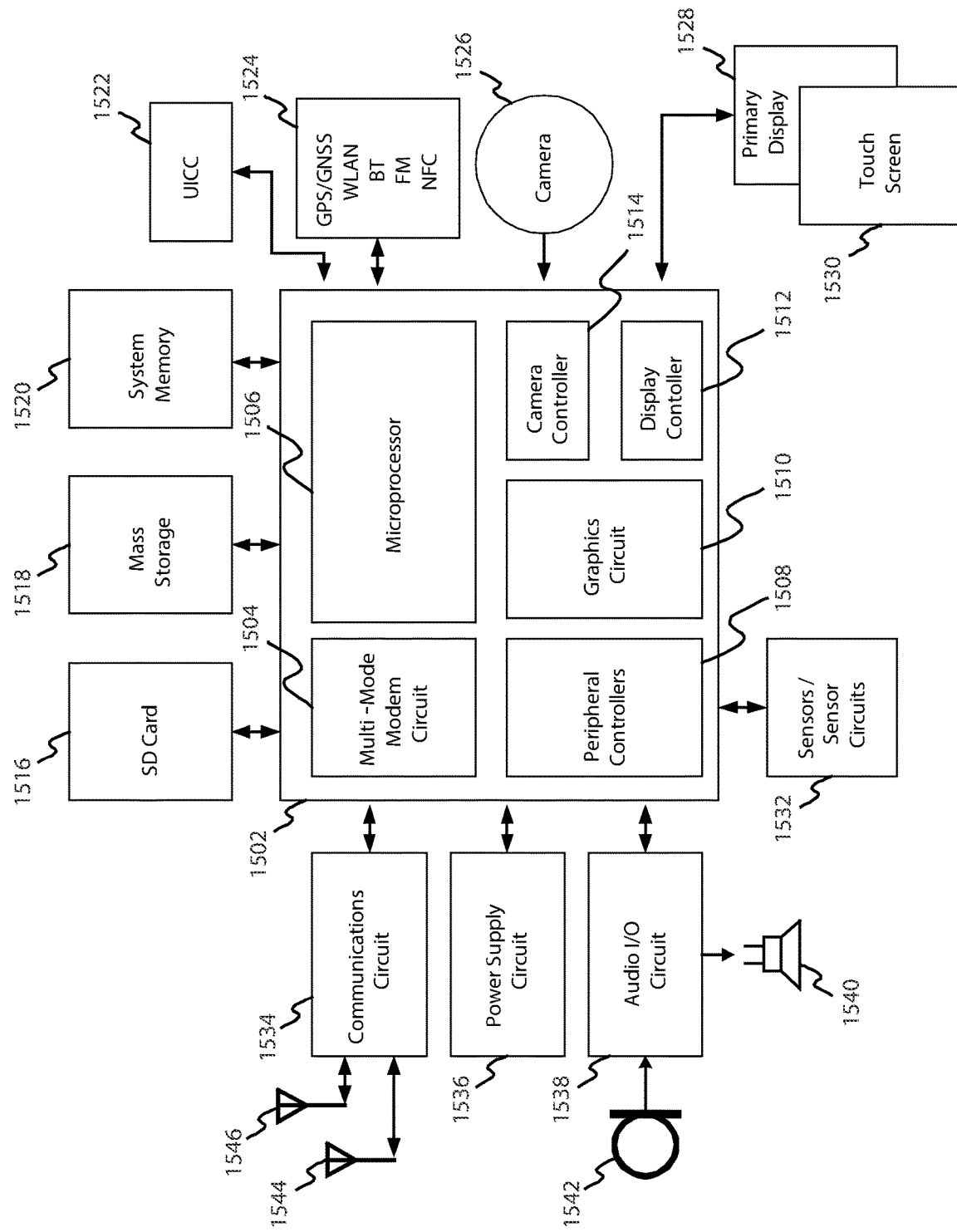
FIG. 15 is a block diagram view of components of an accessory device in accordance with various embodiments herein.

Referring now to FIG. 15, a schematic block diagram is shown of components of an accessory device (which could be a personal communications device or another type of accessory device) in accordance with various embodiments herein. This block diagram is just provided by way of illustration and it will be appreciated that accessory devices can include greater or lesser numbers of components. The accessory device in this example can include a control circuit 1502. The control circuit 1502 can include various components which may or may not be integrated. In various embodiments, the control circuit 1502 can include a microprocessor 1506, which could also be a microcontroller, FPGA, ASIC, or the like. The control circuit 1502 can also include a multi-mode modem circuit 1504 which can provide communications capability via various wired and wireless standards. The control circuit 1502 can include various peripheral controllers 1508. The control circuit 1502 can also include various sensors/sensor circuits 1532. The control circuit 1502 can also include a graphics circuit 1510, a camera controller 1514, and a display controller 1512. In various embodiments, the control circuit 1502 can interface with an SD card 1516, mass storage 1518, and system memory 1520. In various embodiments, the control circuit 1502 can interface with universal integrated circuit card (UICC) 1522. A spatial location determining circuit (or geolocation circuit) can be included and can take the form of an integrated circuit 1524 that can include components for receiving signals from GPS, GLONASS, BeiDou, Galileo, SBAS, WLAN, BT, FM, NFC type protocols, 5G picocells, or E911. In various embodiments, the accessory device can include a camera 1526. In various embodiments, the control circuit 1502 can interface with a primary display 1528 that can also include a touch screen 1530. In various embodiments, an audio I/O circuit 1538 can interface with the control circuit 1502 as well as a microphone 1542 and a speaker 1540. In various embodiments, a power supply or power supply circuit 1536 can interface with the control circuit 1502 and/or various other circuits herein in order to provide power to the system. In various embodiments, a communications circuit 1534 can be in communication with the control circuit 1502 as well as one or more antennas (1544, 1546).

It will be appreciated that in some cases a trend regarding migraine headaches can be more important than an instantaneous measure or snapshot of such symptoms. For example, an hour-long trend where detected migraine headaches rise to higher and higher levels may represent a greater health danger to an individual (and thus meriting intervention) than a brief spike in detected migraine headache symptom levels. As such, in various embodiments herein the ear-wearable system is configured to record data regarding occurrences of migraine headaches and calculate a trend regarding the same. The trend can span minutes, hours, days, weeks or months. Various actions can be taken by the system or device in response to the trend. For example, wherein the trend is upward (a trend toward increased migraine headaches) the device may initiate suggestions for corrective actions and/or increase the frequency with which such suggestions are provided to the device wearer. If suggestions are already being provided and/or actions are already being taken by the device and the trend is upward (a negative trend toward increased migraine headaches) the device may be configured to change the suggestions/instructions being provided to the device wearer as the current suggestions/instructions are being empirically shown to be ineffective.

In various embodiments, the ear-wearable system can be configured to generate and/or use a predicted migraine headache symptom level of the device wearer in a subsequent time period. For example, in various embodiments, the ear-wearable system can be configured to cross-reference classified migraine headache symptom levels against a calendar of the device wearer and predict migraine headache symptom levels that may be reached during events upcoming on the calendar. In some embodiments, the calendar information can be input into the system or device by the device wearer or another third party. In some embodiments, the calendar information can be supplied by an accessory device, such as a smart phone. In some embodiments, the calendar information can be retrieved using a calendar API. In some cases, the system can offer suggestions to the device wearer in order to prepare for such predicted episodes of migraine headaches.

Pattern Identification

It will be appreciated that in various embodiments herein, a device or a system can be used to detect a pattern or patterns indicative of a migraine headache and/or a trigger of migraine headaches. Also, in various embodiments herein, a device or a system can be used to detect a pattern or patterns indicative of an occurrence of migraine headaches and/or migraine headache symptoms of a specific level of intensity. Such patterns can be detected in various ways. Some techniques are described elsewhere herein, but some further examples will now be described.

As merely one example, one or more sensors can be operatively connected to a controller (such as the control circuit described in FIG. 15) or another processing resource (such as a processor of another device or a processing resource in the cloud). The controller or other processing resource can be adapted to receive data representative of a characteristic of the subject from one or more of the sensors and/or determine statistics of the subject over a monitoring time period based upon the data received from the sensor. As used herein, the term "data" can include a single datum or a plurality of data values or statistics. The term "statistics" can include any appropriate mathematical calculation or metric relative to data interpretation, e.g., probability, confidence interval, distribution, range, or the like. Further, as used herein, the term "monitoring time period" means a period of time over which characteristics of the subject are measured and statistics are determined. The monitoring time period can be any suitable length of time, e.g., 1 millisecond, 1 second, 10 seconds, 30 seconds, 1 minute, 10 minutes, 30 minutes, 1 hour, etc., or a range of time between any of the foregoing time periods.

Any suitable technique or techniques can be utilized to determine statistics for the various data from the sensors, e.g., direct statistical analyses of time series data from the sensors, differential statistics, comparisons to baseline or statistical models of similar data, etc. Such techniques can be general or individual-specific and represent long-term or short-term behavior. These techniques could include standard pattern classification methods such as Gaussian mixture models, clustering as well as Bayesian approaches, machine learning approaches such as neural network models and deep learning, and the like.

Further, in some embodiments, the controller can be adapted to compare data, data features, and/or statistics against various other patterns, which could be prerecorded patterns (baseline patterns) of the particular individual wearing an ear-wearable device herein, prerecorded patterns (group baseline patterns) of a group of individuals wearing ear-wearable devices herein, one or more predetermined patterns that serve as patterns indicative of indicative of an occurrence of a migraine headache trigger or an occurrence of migraine headaches (positive example patterns), one or more predetermined patterns that serve as patterns indicative of the absence of a trigger or an absence of migraine headaches (negative example patterns), or the like. As merely one scenario, if a pattern is detected in an individual that exhibits similarity crossing a threshold value to a particular positive example pattern or substantial similarity to that pattern, wherein the pattern is specific for a migraine headache trigger, a migraine headache, and/or a migraine headache of a specific level of intensity, then that can be taken as an indication of an occurrence of that type of event experienced by the device wearer.

Similarity and dissimilarity can be measured directly via standard statistical metrics such normalized Z-score, or similar multidimensional distance measures (e.g., Mahalanobis or Bhattacharyya distance metrics), or through similarities of modeled data and machine learning. These techniques can include standard pattern classification methods such as Gaussian mixture models, clustering as well as Bayesian approaches, neural network models, and deep learning.

As used herein the term "substantially similar" means that, upon comparison, the sensor data are congruent or have statistics fitting the same statistical model, each with an acceptable degree of confidence. The threshold for the acceptability of a confidence statistic may vary depending upon the subject, sensor, sensor arrangement, type of data, context, condition, etc.

The statistics associated with the health status of an individual (and, in particular, their status with respect to migraine headache triggers and/or migraine headaches), over the monitoring time period, can be determined by utilizing any suitable technique or techniques, e.g., standard pattern classification methods such as Gaussian mixture models, clustering, hidden Markov models, as well as Bayesian approaches, neural network models, and deep learning.

Various embodiments herein specifically include the application of a machine learning classification model. In various embodiments, the ear-wearable system can be configured to periodically update the machine learning classification model based on indicators of triggers and/or migraine headaches experienced by the device wearer and/or by observing migraine headaches experienced by the device wearer as caused by particular potential triggers.

In some embodiments, a training set of data can be used in order to generate a machine learning classification model. The input data can include microphone and/or sensor data as described herein as tagged/labeled with binary and/or non-binary classifications of migraine headache triggers and/or migraine headaches. Binary classification approaches can utilize techniques including, but not limited to, logistic regression, k-nearest neighbors, decision trees, support vector machine approaches, naive Bayes techniques, and the like. Multi-class classification approaches (e.g., for non-binary classifications of triggers and/or migraine headaches) can include k-nearest neighbors, decision trees, naive Bayes approaches, random forest approaches, and gradient boosting approaches amongst others.

In various embodiments, the ear-wearable system is configured to execute operations to generate or update the machine learning model on the ear-wearable device itself. In some embodiments, the ear-wearable system may convey data to another device such as an accessory device or a cloud computing resource in order to execute operations to generate or update a machine learning model herein. In various embodiments, the ear-wearable system is configured to weight certain possible detected indicators of triggers and/or migraine headaches in the machine learning classification model more heavily based on derived correlations specific for the individual as described elsewhere herein.

Sensor Package

Various embodiments herein include a sensor package. Specifically, systems and ear-wearable devices herein can include one or more sensor packages (including one or more discrete or integrated sensors) to provide data for use with operations to characterize the migraine headaches experienced by an individual as well as characterize possible migraine headache triggers. Further details about the sensor package are provided as follows. However, it will be appreciated that this is merely provided by way of example and that further variations are contemplated herein. Also, it will be appreciated that a single sensor may provide more than one type of physiological data. For example, heart rate, respiration, blood pressure, or any combination thereof may be extracted from PPG sensor data.

In various embodiments, the indicators of migraine headaches experienced by the device wearer are derived from data produced by at least one of the microphone and the sensor package. In various embodiments, the sensor package can include at least one including at least one of a heart rate sensor, a heart rate variability sensor, an electrocardiogram (ECG) sensor, a blood oxygen sensor, a blood pressure sensor, a skin conductance sensor, a photoplethysmography (PPG) sensor, a temperature sensor (such as a core body temperature sensor, skin temperature sensor, ear-canal temperature sensor, or another temperature sensor), a motion sensor, an electroencephalograph (EEG) sensor, and a respiratory sensor. In various embodiments, the motion sensor can include at least one of an accelerometer and a gyroscope.

The sensor package can comprise one or a multiplicity of sensors. In some embodiments, the sensor packages can include one or more motion sensors (or movement sensors) amongst other types of sensors. Motion sensors herein can include inertial measurement units (IMU), accelerometers, gyroscopes, barometers, altimeters, and the like. The IMU can be of a type disclosed in commonly owned U.S. patent application Ser. No. 15/331,230, filed Oct. 21, 2016, which is incorporated herein by reference. In some embodiments, electromagnetic communication radios or electromagnetic field sensors (e.g., telecoil, NFMI, TMR, GMR, etc.) sensors may be used to detect motion or changes in position. In some embodiments, biometric sensors may be used to detect body motions or physical activity. Motions sensors can be used to track movements of a patient in accordance with various embodiments herein.

In some embodiments, the motion sensors can be disposed in a fixed position with respect to the head of a patient, such as worn on or near the head or ears. In some embodiments, the operatively connected motion sensors can be worn on or near another part of the body such as on a wrist, arm, or leg of the patient.

According to various embodiments, the sensor package can include one or more of an IMU, and accelerometer (3, 6, or 9 axis), a gyroscope, a barometer (or barometric pressure sensor), an altimeter, a magnetometer, a magnetic sensor, an eye movement sensor, a pressure sensor, an acoustic sensor, a telecoil, a heart rate sensor, a global positioning system (GPS), a temperature sensor, a blood pressure sensor, an oxygen saturation sensor, an optical sensor, a blood glucose sensor (optical or otherwise), a galvanic skin response sensor, a histamine level sensor (optical or otherwise), a microphone, acoustic sensor, an electrocardiogram (ECG) sensor, electroencephalography (EEG) sensor which can be a neurological sensor, a sympathetic nervous stimulation sensor (which in some embodiments can including other sensors described herein to detect one or more of increased mental activity, increased heart rate and blood pressure, an increase in body temperature, increased breathing rate, or the like), eye movement sensor (e.g., electrooculogram (EOG) sensor), myographic potential electrode sensor (or electromyography-EMG), a heart rate monitor, a pulse oximeter or oxygen saturation sensor (SpO2), a wireless radio antenna, blood perfusion sensor, hydrometer, sweat sensor, cerumen sensor, air quality sensor, pupillometry sensor, cortisol level sensor, hematocrit sensor, light sensor, image sensor, and the like.

In some embodiments herein, the ear-wearable device or system can include an air quality sensor. In some embodiments herein, the ear-wearable device or system can include a volatile organic compounds (VOCs) sensor. In some embodiments, the ear-wearable device or system can include a particulate matter sensor.

In lieu of, or in addition to, sensors for certain properties as described herein, the same information can be obtained via interface with another device and/or through an API as accessed via a data network using standard techniques for requesting and receiving information.

In some embodiments, the sensor package can be part of an ear-wearable device. However, in some embodiments, the sensor packages can include one or more additional sensors that are external to an ear-wearable device. For example, various of the sensors described above can be part of a wrist-worn or ankle-worn sensor package, or a sensor package supported by a chest strap. In some embodiments, sensors herein can be disposable sensors that are adhered to the device wearer ("adhesive sensors") and that provide data to the ear-wearable device or another component of the system.

Data produced by the sensor(s) of the sensor package can be operated on by a processor of the device or system.

As used herein the term "inertial measurement unit" or "IMU" shall refer to an electronic device that can generate signals related to a body's specific force and/or angular rate. IMUs herein can include one or more accelerometers (3, 6, or 9 axis) to detect linear acceleration and a gyroscope to detect rotational rate. In some embodiments, an IMU can also include a magnetometer to detect a magnetic field.

The eye movement sensor may be, for example, an electrooculographic (EOG) sensor, such as an EOG sensor disclosed in commonly owned U.S. Pat. No. 9,167,356, which is incorporated herein by reference. The pressure sensor can be, for example, a MEMS-based pressure sensor, a piezo-resistive pressure sensor, a flexion sensor, a strain sensor, a diaphragm-type sensor, and the like.

The temperature sensor can be, for example, a thermistor (thermally sensitive resistor), a resistance temperature detector, a thermocouple, a semiconductor-based sensor, an infrared sensor, or the like.

The blood pressure sensor can be, for example, a pressure sensor. The heart rate sensor can be, for example, an electrical signal sensor, an acoustic sensor, a pressure sensor, an infrared sensor, an optical sensor, or the like.

The electrical signal sensor can include two or more electrodes and can include circuitry to sense and record electrical signals including sensed electrical potentials and the magnitude thereof (according to Ohm's law where V=IR) as well as measure impedance from an applied electrical potential. The electrical signal sensor can be an impedance sensor.

The oxygen saturation sensor (such as a blood oximetry sensor) can be, for example, an optical sensor, an infrared sensor, a visible light sensor, or the like.

It will be appreciated that the sensor package can include one or more sensors that are external to the ear-wearable device. In addition to the external sensors discussed hereinabove, the sensor package can comprise a network of body sensors (such as those listed above) that sense movement of a multiplicity of body parts (e.g., arms, legs, torso). In some embodiments, the ear-wearable device can be in electronic communication with the sensors or processor of another medical device, e.g., an insulin pump device or a heart pacemaker device.

Own Voice Detection

Distinguishing between speech or sounds associated with the device wearer and speech or sounds associated with a third party can be important if using changes in the device wearer's voice to detect signs of a migraine headache and/or triggers for a migraine headache. This can be performed in various ways. In some embodiments, this can be performed through signal analysis of the signals generated from the microphone(s). For example, in some embodiments, this can be done by filtering out frequencies of sound that are not associated with speech of the device-wearer. In some embodiments, such as where there are two or more microphones (on the same ear-wearable device or on different ear-wearable devices) this can be done through spatial localization of the origin of the speech or other sounds and filtering out, spectrally subtracting, or otherwise discarding sounds that do not have an origin within the device wearer. In some embodiments, such as where there are two or more ear-worn devices, own-voice detection can be performed and/or enhanced through correlation or matching of intensity levels and or timing.

In some cases, the system can include a bone conduction microphone to preferentially pick up the voice of the device wearer. In some cases, the system can include a directional microphone that is configured to preferentially pick up the voice of the device wearer. In some cases, the system can include an intracanal microphone (a microphone configured to be disposed within the ear-canal of the device wearer) to preferentially pick up the voice of the device wearer. In some cases, the system can include a motion sensor (e.g., an accelerometer configured to be on or about the head of the wearer) to preferentially pick up skull vibrations associated with the vocal productions of the device wearer.

In some cases, an adaptive filtering approach can be used. By way of example, a desired signal for an adaptive filter can be taken from a first microphone and the input signal to the adaptive filter is taken from the second microphone. If the hearing aid wearer is talking, the adaptive filter models the relative transfer function between the microphones. Own-voice detection can be performed by comparing the power of an error signal produced by the adaptive filter to the power of the signal from the standard microphone and/or looking at the peak strength in the impulse response of the filter. The amplitude of the impulse response should be in a certain range to be valid for the own voice. If the user's own voice is present, the power of the error signal will be much less than the power of the signal from the standard microphone, and the impulse response has a strong peak with an amplitude above a threshold. In the presence of the user's own voice, the largest coefficient of the adaptive filter is expected to be within a particular range. Sound from other noise sources results in a smaller difference between the power of the error signal and the power of the signal from the standard microphone, and a small impulse response of the filter with no distinctive peak. Further aspects of this approach are described in U.S. Pat. No. 9,219,964, the content of which is herein incorporated by reference.

In another approach, the system uses a set of signals from a number of microphones. For example, a first microphone can produce a first output signal A from a filter and a second microphone can produce a second output signal B from a second filter. The apparatus includes a first directional filter adapted to receive the first output signal A and produce a first directional output signal. A digital signal processor is adapted to receive signals representative of the sounds from the user's mouth from at least one or more of the first and second microphones and to detect at least an average fundamental frequency of voice (pitch output) $F_0$. A voice detection circuit is adapted to receive the second output signal B and the pitch output $F_0$ and to produce an own voice detection trigger T. The apparatus further includes a mismatch filter adapted to receive and process the second output signal B, the own voice detection trigger T, and an error signal E, where the error signal E is a difference between the first output signal A and an output O of the mismatch filter. A second directional filter is adapted to receive the matched output O and produce a second directional output signal. A first summing circuit is adapted to receive the first directional output signal and the second directional output signal and to provide a summed directional output signal (D). In use, at least the first microphone and the second microphone are in relatively constant spatial position with respect to the user's mouth, according to various embodiments. Further aspects of this approach are described in U.S. Pat. No. 9,210,518, the content of which is herein incorporated by reference.

In various embodiments herein, a device or system can specifically include an inward-facing microphone (e.g., facing the ear canal, or facing tissue, as opposed to facing the ambient environment.) A sound signal captured by the inward-facing microphone can be used to determine physiological information, such as that relating to a physiological response indicative of migraine headaches. For example, a signal from an inward-facing microphone may be used to determine heart rate, respiration, or both, e.g., from sounds transferred through the body. In some examples, a measure of blood pressure may be determined, e.g., based on an amplitude of a detected physiologic sound (e.g., louder sound correlates with higher blood pressure.)

Methods

Many different methods are contemplated herein, including, but not limited to, methods of making devices, methods of using devices, methods of detecting migraine headache triggers or migraine headaches, methods of monitoring migraine headaches, methods of treating migraine headaches, or preventing migraine headache episodes, and the like. Aspects of system/device operation described elsewhere herein can be performed as operations of one or more methods in accordance with various embodiments herein.

Methods

Many different methods are contemplated herein, including, but not limited to, methods of making, methods of using, and the like. Aspects of system/device operation described elsewhere herein can be performed as operations of one or more methods in accordance with various embodiments herein.

In an embodiment, a method of predicting or detecting the onset or presence of a migraine with an ear-wearable device or system is included. The method can include evaluating at least one of signals from a microphone, signals from a sensor package, signals from an external sensor, and contextual factor data, and predicting or detecting the onset or presence of the migraine based on the evaluation.

In an embodiment, the method can further include detecting the onset or presence of the migraine by matching a signal pattern with one or more predetermined patterns indicating onset or presence of a migraine.

In an embodiment, the method can further include detecting at least one migraine trigger. In an embodiment, the method can further include changing a migraine onset detection parameter or threshold following detection of the migraine trigger.

In an embodiment, the method can further include querying a device wearer regarding a detected onset or presence of a migraine. In an embodiment, the method can further include querying a device wearer regarding a severity of a detected migraine. In an embodiment, the method can further include receiving input from a device wearer regarding a migraine. In an embodiment, the method can further include querying a device wearer regarding at least one of nausea, vomiting, and sensitivity to sound and light.

In an embodiment, the method can further include evaluating at least one of microphone data and motion sensor data to detect vomiting. In an embodiment, the method can further include evaluating ECG data for one or more of PR interval change, corrected QT interval change, and heart rate variability change. In an embodiment, the method can further include evaluating EEG data for one or more of a change in amplitude of contingent negative variation (CNV) and a pattern of increased alpha rhythm variability and/or asymmetry. In an embodiment, the method can further include evaluating EMG data for a change in EMG activity.

In an embodiment, the method can further include evaluating EOG data for a change in REM density. In an embodiment, the method can further include evaluating motion sensor data for one or more of device wearer posture, device wearer forward head extension, and device wearer imbalance. In an embodiment, the method can further include evaluating GSR data for one or more of hot sweat and indicators of cognitive load or stress. In an embodiment, the method can further include evaluating body temperature data for a change in body temperature.

In an embodiment, the method can further include evaluating PPG data for one or more of blood vessel dilation status, constriction of blood vessels, and a change in heart rate variability.

In an embodiment, the method can further include evaluating biochemical sensor data for changes in estrogen and progesterone. In an embodiment, the method can further include evaluating barometric pressure data for a change in atmospheric pressure.

In an embodiment, the method can further include evaluating optical sensor data for one or more of fluorescent light, blue light, LED lights, sunlight, light intensity, light duration, light brightness, and light flicker/flash frequency.

In an embodiment, the method can further include evaluating microphone data for one or more of loud noises, sound heterogeneity, predetermined environments, decreased speaking rate, slurred speech, speech fluency problems, device wearer babble, and phrases indicative of migraines.

In an embodiment, the method can further include classifying a detected migraine.

In an embodiment, the method can further include delivering a suggestion to a device wearer regarding an action to take. In an embodiment, the method can further include executing a mitigating action when a migraine is detected. In an embodiment, the method can further include detecting or confirm with device wearer an alleviation event.

In an embodiment, the method can further include operating in a migraine accommodation mode when a migraine is detected or a device wearer provides an input to enter the migraine accommodation mode.

In an embodiment, the method can further include outputting data regarding a predicted or detected onset or presence of a migraine to an external device. In an embodiment, the method can further include issuing a notice regarding a predicted or detected onset or presence of a migraine to a third party.

In an embodiment, the migraine can include a migraine headache.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. An ear-wearable system comprising:
    a first ear-wearable device, the first ear-wearable device comprising
        a first control circuit;
        a first microphone, wherein the first microphone is in electrical communication with the first control circuit; and
        a first sensor package, wherein the first sensor package is in electrical communication with the first control circuit;
    a second ear-wearable device, the second ear-wearable device comprising
        a second control circuit;
        a second microphone, wherein the second microphone is in electrical communication with the second control circuit; and
        a second sensor package, wherein the second sensor package is in electrical communication with the second control circuit;
    wherein the ear-wearable system is configured to
        evaluate at least one of signals from the first microphone, signals from the second microphone, signals from the first sensor package, signals from the second sensor package, signals from an external sensor, and contextual factor data over a first time period;
        predict or detect the onset or presence of a migraine based on the evaluation;
        evaluate at least one of signals from the first microphone, signals from the second microphone, signals from the first sensor package, signals from the second sensor package, and signals from an external sensor over a lookback period prior to the first time period; and
        detect a migraine trigger within the lookback period.

2. The ear-wearable system of claim 1, wherein the ear-wearable system is configured to detect the onset or presence of the migraine by matching a signal pattern with one or more predetermined patterns indicating onset or presence of a migraine.

3. The ear-wearable system of claim 1, the migraine trigger comprising at least one selected from the group consisting of a detected condition of stress, an amount and/or quality of sleep or a sleep pattern, an amount of food or drink intake, a type or content of food or drink, and/or a food or drink intake pattern, a hydration level, consumption of caffeine or alcohol, a time of day, a time of month, a time of year, medication usage, sensory exposure to at least one of noise, light, scents, and motion, and a weather status.

4. The ear-wearable system of claim 1, wherein the ear-wearable system is configured to change a migraine onset detection parameter or threshold following detection of the migraine trigger.

5. The ear-wearable system of claim 1, wherein the ear-wearable system is configured to query a device wearer regarding a detected onset or presence of a migraine.

6. The ear-wearable system of claim 1, wherein the ear-wearable system is configured to receive input from a device wearer regarding a migraine.

7. The ear-wearable system of claim 1, the contextual factor data comprising at least one selected from the group consisting of time of day, geolocation, local weather data, device wearer sleep data, device wearer nutrition data, device wearer menstruation data, device wearer stress data, and device wearer medication data.

8. The ear-wearable system of claim 1, wherein the ear-wearable system is configured to evaluate at least one of microphone data and motion sensor data to detect vomiting.

9. The ear-wearable system of claim 1, wherein the ear-wearable system is configured to evaluate microphone data for one or more of loud noises, sound heterogeneity, predetermined environments, decreased speaking rate, slurred speech, speech fluency problems, device wearer babble, and phrases indicative of migraines.

10. The ear-wearable system of claim 1, wherein the ear-wearable system is configured to deliver a suggestion to a device wearer regarding an action to take.

11. The ear-wearable system of claim 1, wherein the ear-wearable system is configured to execute a mitigating action when a migraine is detected.

12. The ear-wearable system of claim 11, the mitigating action comprising at least one selected from the group consisting of modifying a tinnitus therapy parameter, administering ASMR or binaural beat therapy, decreasing hearing aid gain, changing sound compression or expansion, decreasing blue light on one or more devices, decreasing room temperature, dimming lights, initiating aromatherapy, and delivering acoustic therapy.

13. The ear-wearable system of claim 1, wherein the ear-wearable system is configured to detect or confirm with device wearer an alleviation event.

14. The ear-wearable system of claim 13, the alleviation event comprising at least one selected from the group consisting of a medication administration event, a cooler temperature about an ear of the device wearer, ambient light changes, meditation sounds, and body movements.

15. The ear-wearable system of claim 1, wherein the ear-wearable system is configured to operate in a migraine accommodation mode when a migraine is detected or a device wearer provides an input to enter the migraine accommodation mode.

16. The ear-wearable system of claim 1, wherein the ear-wearable system is configured to issue a notice regarding a predicted or detected onset or presence of a migraine to a third party.

17. The ear-wearable system of claim 1, wherein the lookback period is between about 5 seconds and one hour prior to the first time period.

18. An ear-wearable system comprising:
a first ear-wearable device configured to be worn by a user, the first ear-wearable device comprising
a first control circuit;
a first microphone, wherein the first microphone is in electrical communication with the first control circuit; and
a first sensor package, wherein the first sensor package is in electrical communication with the first control circuit;
wherein the ear-wearable system is configured to:
evaluate signals from the first microphone over a first time period, the signals comprising a voice of the user;
predict or detect the onset or presence of a migraine based on the evaluation;
evaluate at least one of signals from the first microphone, signals from the first sensor package, and signals from an external sensor over a lookback period prior to the first time period; and
detect a migraine trigger within the lookback period.

19. The ear-wearable system of claim 18, wherein predicting or detecting the onset or presence of the migraine comprises detecting one or more trigger words in the voice of the user.

20. The ear-wearable system of claim 18, wherein predicting or detecting the onset or presence of the migraine comprises detecting one or more of a change in properties in the voice of the user and a change in speech rate in the voice of the user.

* * * * *